(12) United States Patent
Kuse et al.

(10) Patent No.: US 10,119,644 B2
(45) Date of Patent: Nov. 6, 2018

(54) WINDING MACHINE

(71) Applicant: SEKISUI CHEMICAL CO., LTD., Osaka-shi, Osaka (JP)

(72) Inventors: Keita Kuse, Ritto (JP); Jun Tsuda, Ritto (JP); Tatsurou Baba, Ritto (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 14 days.

(21) Appl. No.: 15/315,642

(22) PCT Filed: Jun. 4, 2015

(86) PCT No.: PCT/JP2015/066167
§ 371 (c)(1),
(2) Date: Dec. 1, 2016

(87) PCT Pub. No.: WO2015/186779
PCT Pub. Date: Dec. 10, 2015

(65) Prior Publication Data
US 2017/0191600 A1 Jul. 6, 2017

(30) Foreign Application Priority Data
Jun. 4, 2014 (JP) .................................. 2014-116214

(51) Int. Cl.
*F16L 55/165* (2006.01)
*B29C 63/30* (2006.01)

(52) U.S. Cl.
CPC .......... *F16L 55/1655* (2013.01); *B29C 63/30* (2013.01)

(58) Field of Classification Search
CPC ............................. F16L 55/1655; B29C 63/30
See application file for complete search history.

(56) References Cited

U.S. PATENT DOCUMENTS 2,917,820 A * 12/1959 Matheny ............. B28B 19/0023
219/58
3,401,442 A * 9/1968 Matheny ............. B28B 19/0023
140/2
(Continued)

FOREIGN PATENT DOCUMENTS

EP 0 756 130 A2 1/1997
EP 1 277 562 A2 1/2003
(Continued)

OTHER PUBLICATIONS

International Search Report for the Application No. PCT/JP2015/066167 dated Sep. 1, 2015.

*Primary Examiner* — Benjamin F Fiorello
(74) *Attorney, Agent, or Firm* — Cheng Law Group, PLLC

(57) ABSTRACT

A winding machine (1) includes a main body (20), a first arm (40), and a second arm (50). The main body (20) moves toward a winding direction front side as a profile strip (100) is added, while rotating at a winding direction front end portion of a formed pipe member (4). The first and the second arms (40) and (50) are respectively supported by the main body (20) at positions away from each other in a circumference direction of the formed pipe member (4), and extend toward a winding direction rear side between an existing pipe (2) and the formed pipe member (4). The first arm (40) includes a first restricting portion (43) that comes into contact with a winding direction front side of a reinforcement member (120) provided to the profile strip (100) forming the formed pipe member (4) via the profile strip (100). The second arm (50) includes a second restricting portion (52) that comes into contact with a side of the reinforcement member (120) provided to the profile strip (100) forming the formed pipe member (4) opposite to the (Continued)

side to be in contact with the first restricting portion (43), via the profile strip (100).

15 Claims, 27 Drawing Sheets

(56) References Cited

U.S. PATENT DOCUMENTS

| | | | | |
|---|---|---|---|---|
| 5,101,863 | A * | 4/1992 | Fujii | F16L 55/1655 138/154 |
| 5,799,701 | A | 9/1998 | Kitahashi et al. | |
| 6,637,092 | B1 * | 10/2003 | Menzel | B21C 37/121 264/36.16 |
| 7,004,202 | B2 * | 2/2006 | Bateman | F16L 55/1655 138/122 |
| 8,151,827 | B2 * | 4/2012 | Ohira | B29C 53/78 138/97 |
| 8,596,917 | B2 * | 12/2013 | Emmons | F16L 55/1655 138/129 |
| 9,248,485 | B2 * | 2/2016 | Nakagaki | B29C 53/785 |
| 2004/0013472 | A1 * | 1/2004 | Akimoto | F16L 55/1655 405/184.2 |
| 2008/0205991 | A1 * | 8/2008 | Bateman | B29C 53/72 405/184.2 |
| 2009/0129869 | A1 * | 5/2009 | Zivanovic | F16L 55/1655 405/184.2 |
| 2010/0008731 | A1 * | 1/2010 | Kakine | B29C 53/72 405/184.2 |
| 2010/0184577 | A1 | 7/2010 | Nakagaki et al. | |
| 2013/0247632 | A1 | 9/2013 | Nakagaki et al. | |

FOREIGN PATENT DOCUMENTS

| | | |
|---|---|---|
| EP | 2 172 327 A1 | 4/2010 |
| JP | 8-61559 A | 3/1996 |
| JP | 8-200547 A | 8/1996 |
| JP | 8-261363 A | 10/1996 |
| JP | 9-32968 A | 2/1997 |
| JP | 9-57850 A | 3/1997 |
| JP | 2008-126647 A | 6/2008 |
| JP | 2009-34997 A | 2/2009 |
| JP | 2009-149049 A | 7/2009 |
| JP | 4866428 B2 | 2/2012 |
| JP | 2014-113793 A | 6/2014 |
| WO | WO-96/06296 A1 | 2/1996 |
| WO | WO-2008/075681 A1 | 6/2008 |
| WO | WO-2009/008505 A1 | 1/2009 |

* cited by examiner

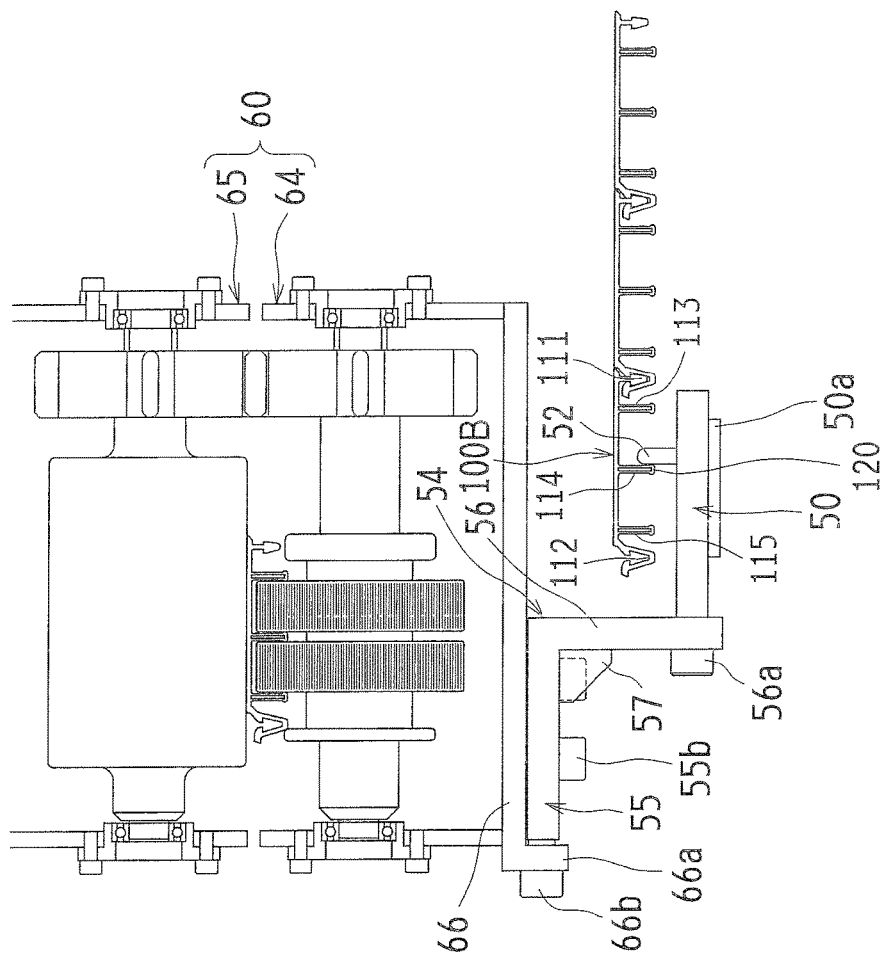
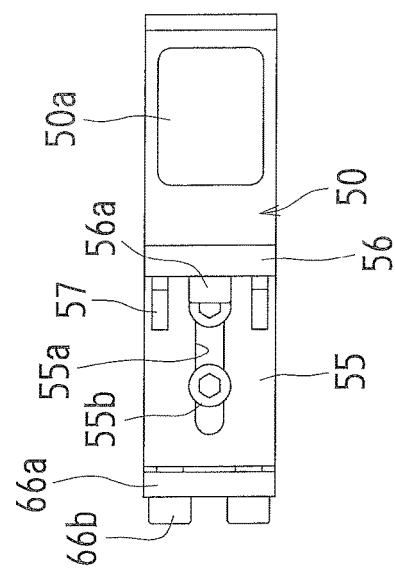
Fig.13A
Fig.13B

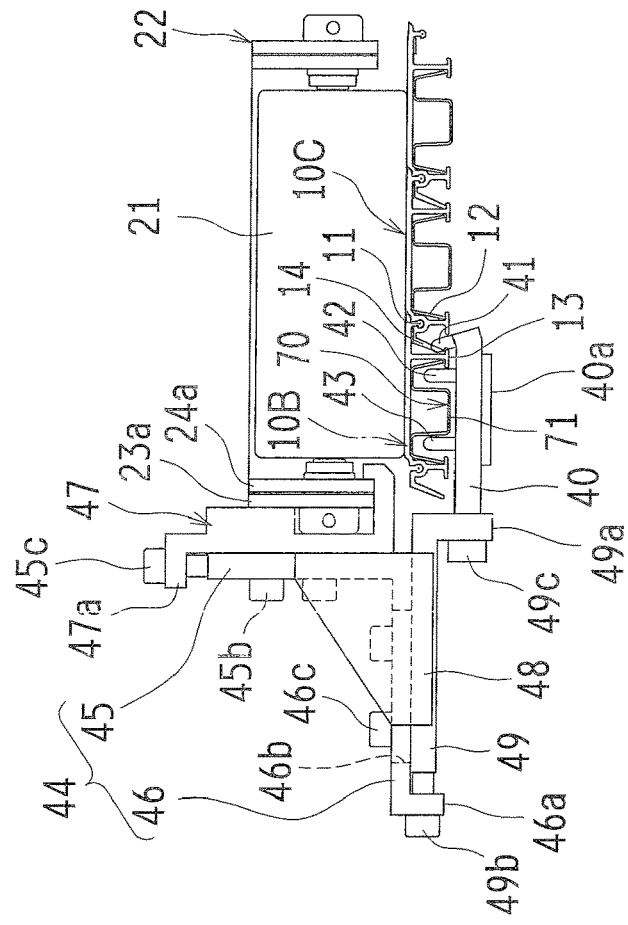
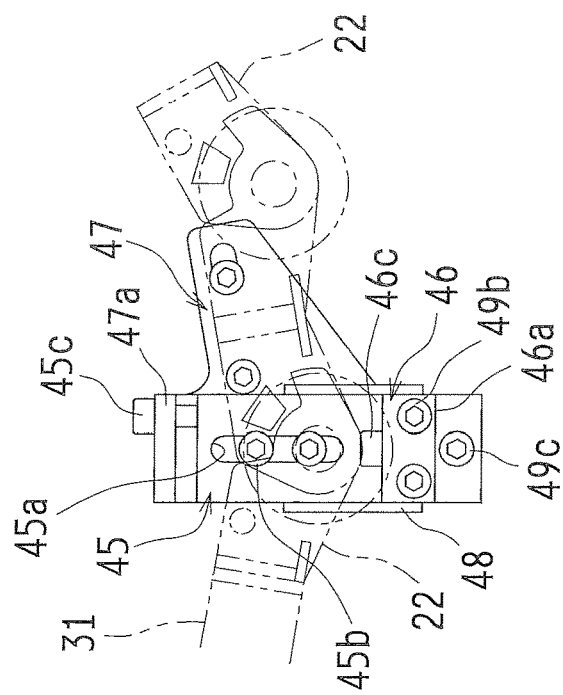
Fig.22B
Fig.22A

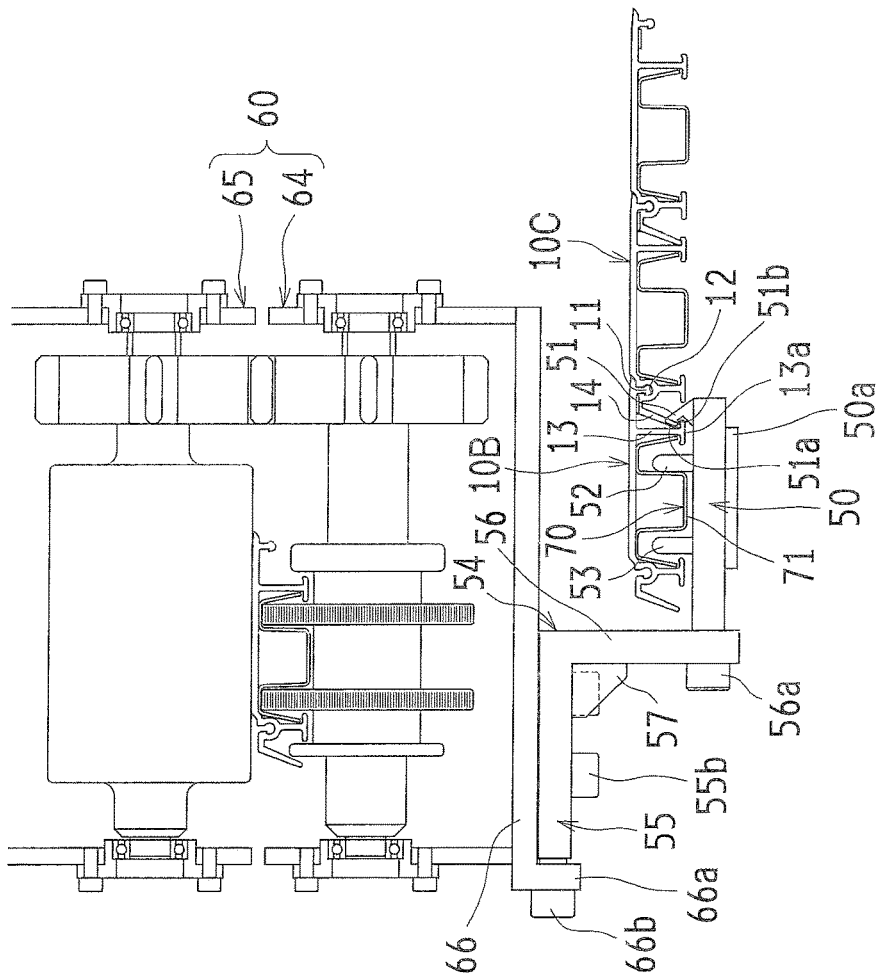
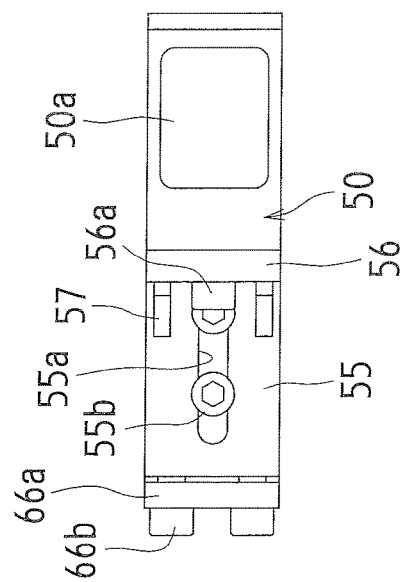
Fig.23B
Fig.23A

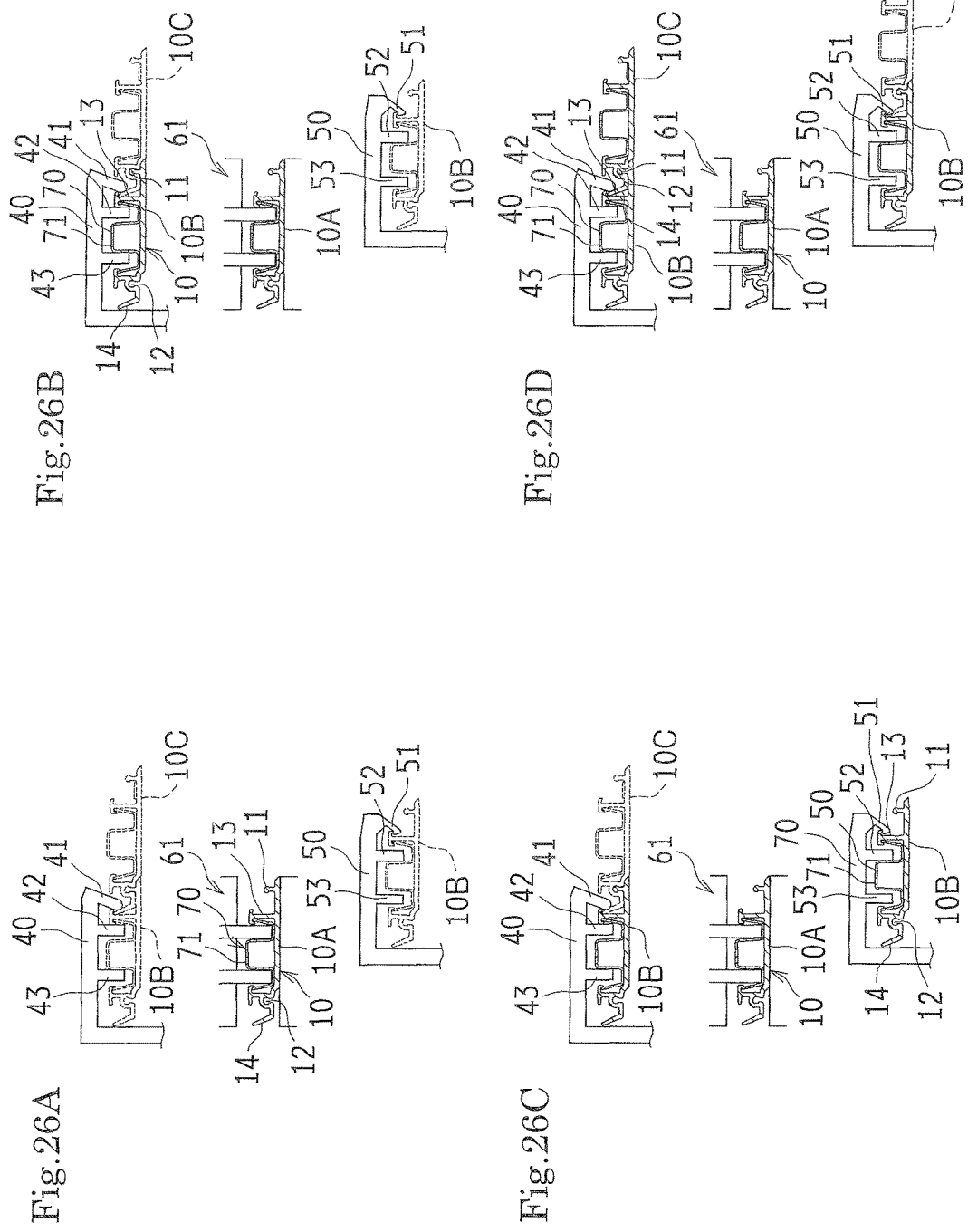

WINDING MACHINE

TECHNICAL FIELD

The present invention relates to a winding machine that forms a rehabilitating pipe in an existing pipe that has deteriorated.

BACKGROUND ART

In a widely employed conventional method for a deteriorated existing pipe, such as a sewage pipe and a water supply pipe, an inner circumference surface of the deteriorated existing pipe is rehabilitated with a pipe member referred to as a rehabilitating pipe formed in the existing pipe. The rehabilitating pipe is formed by spirally winding a profile strip with an elongated shape by connecting width direction end portions of the profile strip overlapping each other. The rehabilitating pipe can be formed in various ways. In one known exemplary method, the rehabilitating pipe is formed by sequentially adding a newly supplied portion of the profile strip to a front side of a pipe member that has been formed, while moving a winding machine in a winding direction.

For example, Patent Literature 1 discloses a self-propelled winding machine. The winding machine forms a rehabilitating pipe by using a profile strip. The profile strip includes fitting portions that fit each other and are continuously formed on respective both end portions in a width direction. More specifically, a fitting portion of a newly supplied profile strip is fit, using power used to feed the profile strip, to a fitting portion of a profile strip serving as an end portion of the pipe member that has been formed.

CITATION LIST

Patent Literature

PTL 1: Japanese Patent No. 4866428

SUMMARY OF INVENTION

Technical Problem

The rehabilitating pipe using the profile strip is not formed in a favorable environment, such as a manufacturing factory for example. Rather, the rehabilitating pipe is formed in a small space in an existing pipe, and under a work condition varying among existing pipes. Thus, various problems occur when the rehabilitating pipe is formed. The profile strip has different shapes and the like for different applications. A certain shape and the like of the profile strip might be a cause of a problem occurring when the rehabilitating pipe is formed.

For example, the following problem due to the work condition might occur. When the rehabilitating pipe is formed in the existing pipe, in service with a large amount of water flowing therein, the winding machine might be pushed out from a pipe member (the rehabilitating pipe being formed) by water pressure of the flowing water. Furthermore, when the existing pipe has a step portion or a bent portion, the winding machine might receive force from the step portion or the bent portion to be jammed in the pipe member.

For example, the following problem due to the shape of the profile strip might occur. When the profile strip includes the fitting portions, known as main locks, continuously formed on respective both end portions in the width direction, and further includes engagement portions known as sub locks, engagement of the sub locks might fail to be achieved (see FIG. 20(c)).

It might seem that the winding machine can be prevented from being pushed out from or being jammed in the pipe member with an easy solution of using counter force from the pipe member. Unfortunately, the counter force cannot be easily obtained from the pipe member because an inner circumference surface of the rehabilitating pipe is finished to be smooth so that sewage water and clean water can easily flow. Furthermore, the sub locks that have failed to engage are difficult to engage later on in a small gap between the existing pipe and the rehabilitating pipe that has been formed. Forming the rehabilitating pipe is sufficiently achieved when the main locks are fit to each other, and thus a portion where the engagement of the sub lock has failed is difficult to identify from the inner side of the rehabilitating pipe.

The present invention is made in view of the problems described above, and an object of the present invention is to provide a winding machine with which a rehabilitating pipe can certainly be formed, with an arm provided with a member using an outer circumference portion of the rehabilitating pipe being formed or a member acting on the outer circumference portion of the rehabilitating pipe being formed, in accordance with a work condition, a shape of a profile strip, and the like.

Solution to Problem

A solution according to the present invention for achieving the object is directed to a winding machine that forms a rehabilitating pipe in an existing pipe. The rehabilitating pipe is formed with a profile strip having an elongated shape and having fitting portions continuously formed on respective both end portions in a width direction supplied in the existing pipe, in such a manner that a width direction rear side fitting portion of a newly supplied portion of the profile strip is fit to a width direction front side fitting portion of the profile strip positioned at a winding direction front end of a pipe member including the profile strip that has been formed in a pipe form. The profile strip is formed with a reinforcement member in an elongated form mounted on an outer side surface or embedded inside. The winding machine includes: a main body that moves toward a winding direction front side as the profile strip is added, while rotating at a winding direction front end portion of the pipe member; and first and second arms that are supported by the main body respectively at positions away from each other in a circumference direction of the pipe member, and extend toward a winding direction rear side between the existing pipe and the pipe member. The first arm includes a first restricting portion that comes into contact with a winding direction front or rear side of the reinforcement member provided to the profile strip forming the pipe member, directly or via the profile strip. The second arm includes a second restricting portion that comes into contact with a side of the reinforcement member provided to the profile strip forming the pipe member opposite to the side to be in contact with the first restricting portion, directly or via the profile strip.

As described above, the first and the second arm each extending toward the winding direction rear side between the existing pipe and the pipe member are provided. Thus, a member using an outer circumference portion of the rehabilitating pipe being formed in accordance with a work condition can be provided. For example, when the existing pipe includes a step portion or a bent portion, the winding machine that has received force from the step portion or the bent portion of the existing pipe can be prevented from being jammed in the pipe member, with the first arm being provided with the first restricting portion that comes into contact with the winding direction front side of the reinforcement member. In this configuration, the second restricting portion provided to the second arm comes into contact with the winding direction rear side (the side opposite to the side to be in contact with the first restricting portion) of the reinforcement member. Thus, water pressure from the winding direction rear side acts on the winding machine forming the rehabilitating pipe in the existing pipe, in service with a large amount of water flowing therein, the reinforcement member is caught by the second restricting portion. Thus, the winding machine can be prevented from being pushed out from the pipe member toward the winding direction front side. The first restricting portion and the second restricting portion are at the position away from each other and come into contact with the reinforcement member in opposite directions. Thus, the winding machine can be prevented from rotating around a radial direction of the pipe member. Thus, the position of the winding machine relative to the pipe member in the winding direction is maintained to be constant, whereby the fitting portion of the newly supplied portion of the profile strip can be certainly fit to the fitting portion to the profile strip that have been formed into a pipe form.

The solution according to the present invention is also directed to a winding machine that includes: an arm that is supported by the main body and extends toward a winding direction rear side between the existing pipe and the pipe member; and a roller that is rotatably supported by the main body at a position away from the arm in a circumference direction of the pipe member, and includes a flange that comes into contact with a winding direction front end of the pipe member. The arm includes a restricting portion that comes into contact with a winding direction rear side of the reinforcement member provided to the profile strip forming the pipe member, directly or via the profile strip.

The member that uses the outer circumference portion of the rehabilitating pipe being formed in accordance with a work condition can also be provided with the combination of the arm that extends toward a winding direction rear side between the existing pipe and the pipe member; and a roller including the flange that comes into contact with the winding direction front end of the pipe member. More specifically, the winding machine can be prevented from being pushed out from the pipe member toward the winding direction front side, with the arm provided with the restricting portion that comes into contact with the winding direction rear side of the reinforcement member provided to the profile strip forming the pipe member. When the winding machine receives force from the step portion or the bent portion of the existing pipe, the flange comes into contact with the winding direction front end of the pipe member, whereby the winding machine can be prevented from being jammed in the pipe member. The arm and the roller are at the position away from each other and come into contact with the pipe member in opposite directions. Thus, the winding machine can be prevented from rotating around a radial direction of the pipe member.

The solution according to the present invention is also directed to a winding machine in which the rehabilitating pipe is formed in such a manner that a width direction rear side fitting portion of a newly supplied portion of the profile strip is fit to a width direction front side fitting portion of a first end portion of the profile strip positioned at a winding direction front end of a pipe member. The profile strip includes a reinforcement rib protruding on an outer side surface and an engagement rib extending toward a front side from a width direction front side end portion and being formed with a reinforcement member in an elongated form mounted on the outer side surface or embedded inside. The winding machine includes: a main body that moves toward a winding direction front side as the profile strip is added, while rotating at a winding direction front end portion of the pipe member; and a first arm that is supported by the main body and extends toward a winding direction rear side between the existing pipe and the pipe member. The first arm includes: a first guide portion that comes into contact with the engagement rib of a second end portion of the profile strip that is adjacent to and disposed on a winding direction rear side of the first end portion of the profile strip, and causes the engagement rib to be engaged with the reinforcement rib of the first end portion of the profile strip; and a first restricting portion that comes into contact with a winding direction front side of the reinforcement member provided to the first end portion of the profile strip, directly or via the first end portion of the profile strip.

The first arm extending toward the winding direction rear side between the existing pipe and the pipe member is provided. Thus, a member that acts on the outer circumference of the rehabilitating pipe being formed in accordance with the shape of the profile strip can be provided. More specifically, the first arm includes the first guide portion, whereby the engagement rib of the second end portion profile strip can be engaged with the reinforcement rib over the entire circumference of the first end portion profile strip as the first arm makes a circular movement. The first arm includes the first restricting portion that comes into contact with the winding direction front side of the reinforcement member provided to the first end portion of the profile strip. Thus, even when the second end portion of the profile strip is pressed by the first guide portion toward the winding direction front side, the first end portion of the profile strip is prevented from moving toward the winding direction front side. Thus, a constant distance in the winding direction is maintained between the winding direction front side end portion of the first end portion of the profile strip and the winding direction rear side end portion of the newly supplied portion of the profile strip. Thus, the fitting portion of the profile strip can certainly be fit to each other.

Advantageous Effects of Invention

In the present invention, the arm extending toward the winding direction rear side between the existing pipe and the pipe member is provided. The rehabilitating pipe can certainly be formed with the arm provided with a member using an outer circumference portion of the rehabilitating pipe being formed or a member acting on the outer circumference portion of the rehabilitating pipe being formed, in accordance with a work condition, a shape of a profile strip, and the like.

BRIEF DESCRIPTION OF DRAWINGS

FIG. 12 is a diagram illustrating a first arm, in which

FIG. 13 is a diagram illustrating a second arm, in which FIG. 13(a) is a view as viewed from a radial direction outer side and FIG. 13(b) is a side view.

FIG. 22 is a diagram illustrating a first arm, in which FIG. 22(a) is a front view and FIG. 22(b) is a side view.

FIG. 23 is a diagram illustrating a second arm, in which FIG. 23(a) is a view as viewed from a radial direction outer side and FIG. 23(b) is a side view.

FIG. 26 is a diagram illustrating a relationship among the profile strip and the first and the second arms.

DESCRIPTION OF EMBODIMENTS

Embodiments of the present invention are described below with reference to the drawings.

First Embodiment

Figure 1:
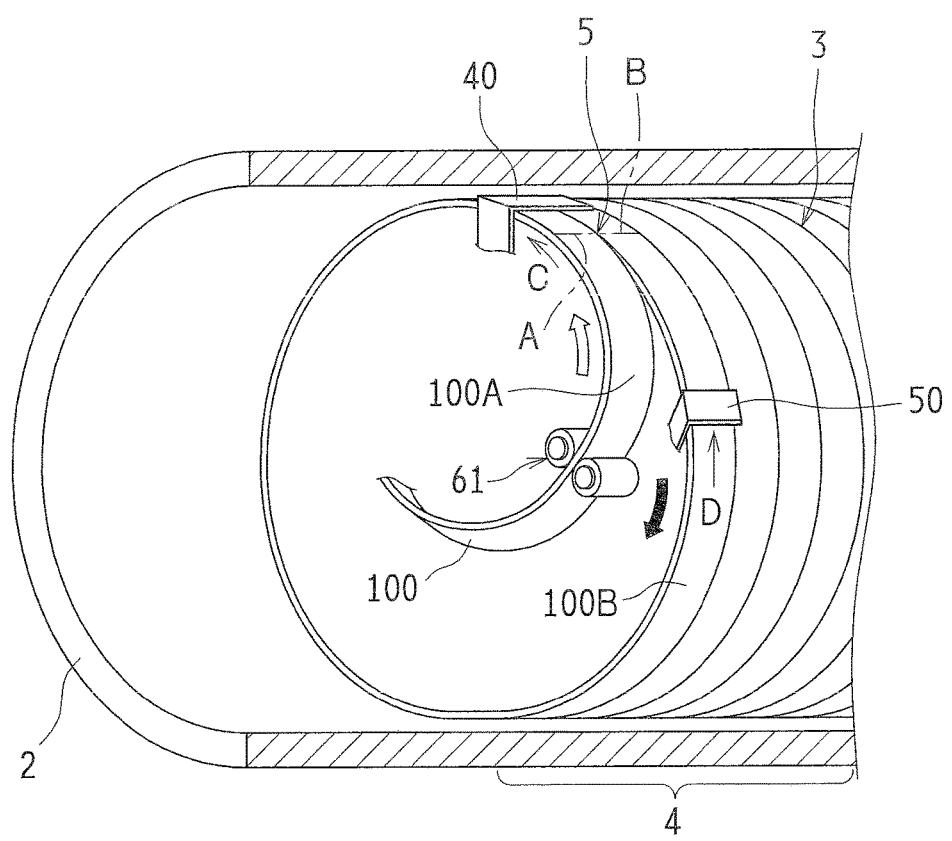
FIG. 1 is a diagram schematically illustrating a basic concept of a first embodiment of the present invention.
Figure 2A:
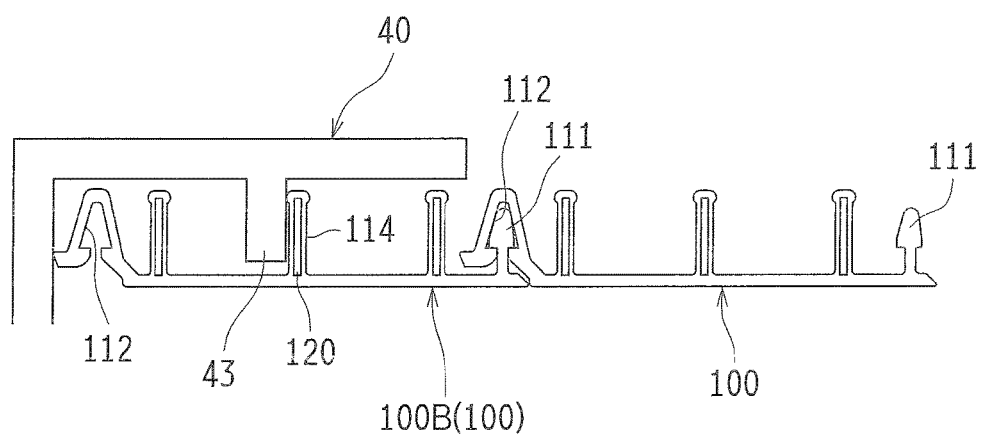
FIG. 2 is a diagram schematically illustrating the basic concept of the first embodiment.
Figure 2B:
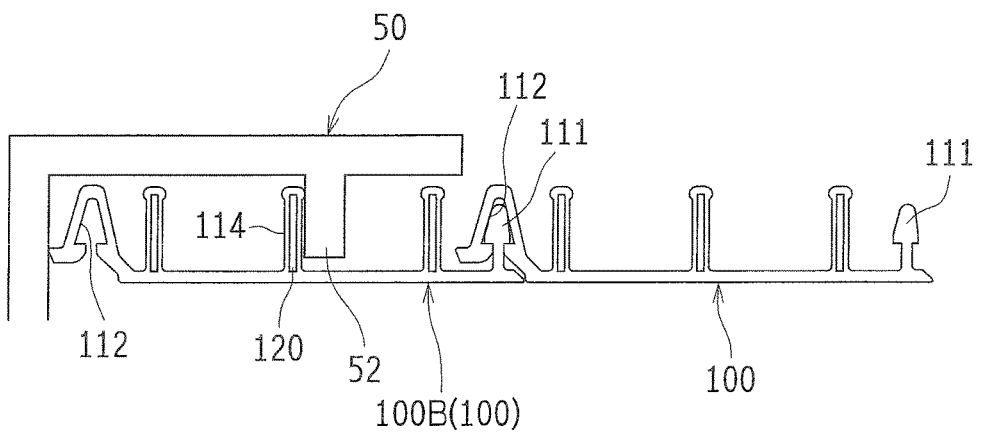
Figure 3:
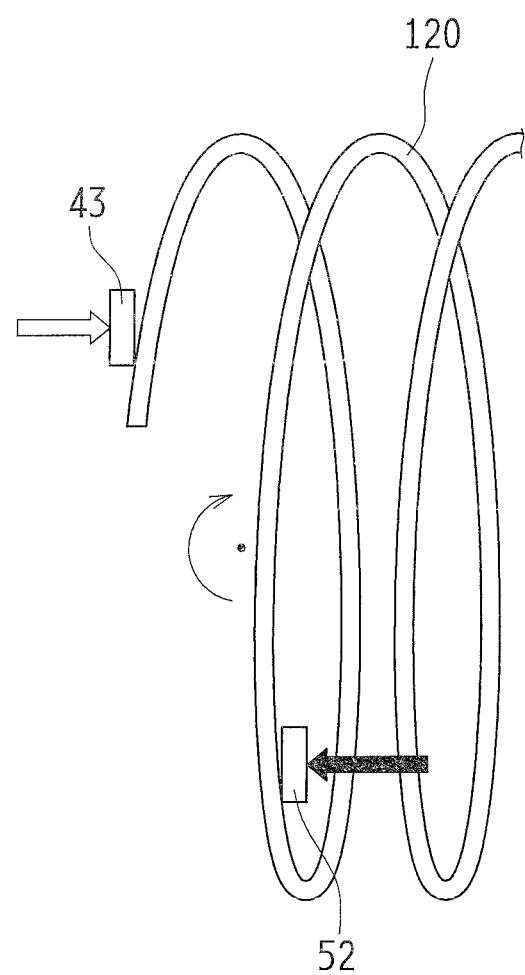
FIG. 3 is a diagram schematically illustrating the basic concept of the first embodiment.

The basic concept of the present embodiment is described before a device configuration of a winding machine 1 (see FIG. 7) and the like are described, so that the present embodiment can be more easily understood. FIG. 1 to FIG. 3 are each a diagram schematically illustrating the basic concept of the present embodiment. In FIG. 1, only a part of the winding machine 1 involving pinch rollers 61, a first arm 40, and a second arm 50 for supplying a profile strip 100 is illustrated for simplification. In the description below, a left side in FIG. 1 that is a downstream side of water flowing in an existing pipe 2 is defined as a winding direction front side. A right side in FIG. 1 that is an upstream side of the water flowing in the existing pipe 2 is defined as a winding direction rear side.

The winding machine 1 according to the present embodiment newly forms a rehabilitating pipe 3 in the existing pipe 2, such as a sewerage pipe, a water supply pipe, an agricultural water pipe, and a gas pipe, by spirally winding the profile strip 100 having an elongated shape. As illustrated in FIG. 2, the profile strip 100 has both end portions in a width direction on which fitting portions 111 and 112 as counterparts are continuously formed. More specifically, the winding machine 1 supplies the profile strip 100 in the existing pipe 2 with the pinch rollers 61 in a direction indicated by a white arrow in FIG. 1. In this process, the fitting portion 111 on a width direction rear side (matches with the winding direction rear side) of a profile strip 100A that is newly supplied is pressed into the fitting portion 112 on a width direction front side (matches with the winding direction front side) of a profile strip 100B as one of the profile strip 100 that has been formed into a pipe form and is positioned at a winding direction front end. Thus, the fitting portions 111 and 112 are fit to each other. All things considered, the winding machine 1 forms the rehabilitating pipe 3 in the existing pipe 2 by sequentially adding the profile strip 100A that is newly supplied to a front end portion of a pipe member 4 that has been formed into a pipe form.

It is to be noted that the "profile strip 100 that has been formed into a pipe form" represents the profile strip 100 having at least the fitting portion 111 on the width direction rear side fit, and corresponds to a portion denoted by a reference numeral 4 in FIG. 1. Hereinafter, the "profile strip 100 that has been formed into a pipe form" are also referred to as a formed pipe member 4.

In the description below, the "end portion profile strip 100B" is the profile strip 100 that is positioned at the winding direction front end of the formed pipe member 4, and corresponds to a portion extending in a supplying direction (white arrow) of the profile strip 100 in FIG. 1 to form a loop from a virtual line A to a virtual line B.

Furthermore, the "profile strip 100A that is newly supplied" corresponds to a portion extending in the supplying direction of the profile strip 100 in FIG. 1 from the pinch rollers 61 to the virtual line A. The "profile strip 100A that is newly supplied" is hereinafter also referred to as a newly supplied profile strip 100A.

The formed pipe member 4, the end portion profile strip 100B, and the newly supplied profile strip 100A are names given to portions of one profile strip 100 having an elongated shape for convenience of explanation, and do not refer to different members.

A "fitting position" is denoted with a reference numeral 5 in FIG. 1 and is a position where the fitting portion 111 on the width direction rear side of the newly supplied profile strip 100A and the fitting portion 112 on the width direction front side of the end portion profile strip 100B that are separated from each other start to fit with each other.

As illustrated in FIG. 1, the pinch rollers 61, the first arm 40, and the second arm 50 are arranged in this order in the supplying direction of the profile strip 100. The first arm 40 is disposed close to the fitting position 5. The first arm 40 and the second arm 50 are disposed at positions away from each other in the circumference direction of the formed pipe member 4, and each extend toward the winding direction rear side between the existing pipe 2 and the formed pipe member 4.

The pinch rollers 61, the first arm 40, and the second arm 50 are supported by a frame 20 (see FIG. 7) of the winding machine 1 described later. The frame 20 moves toward the winding direction front side while rotating in a winding direction front end portion of the formed pipe member 4 as the newly supplied profile strips 100A are added. Thus, the winding machine 1 moves toward the winding direction front side while rotating in a direction indicated by a black arrow in FIG. 1, with relative positional relationship among the pinch rollers 61, the first arm 40, and the second arm 50 maintained.

The first arm 40 and the second arm 50 each having a shape of a plate thinner than a gap between the existing pipe 2 and the formed pipe member 4 can make a circular movement between the formed pipe member 4 and the existing pipe 2 in accordance with the rotation of the frame 20, even when the gap between an outer circumference surface of the formed pipe member 4 and an inner circumference surface of the existing pipe 2 is small. When rigidity of a reinforcement member 120 described later is low, the first arm 40 and the second arm 50 need not to have the thin plate shape to be capable of making a circular movement between the formed pipe member 4 and the existing pipe 2 even when there is substantially no gap between the existing pipe 2 and the formed pipe member 4.

Figure 4A:
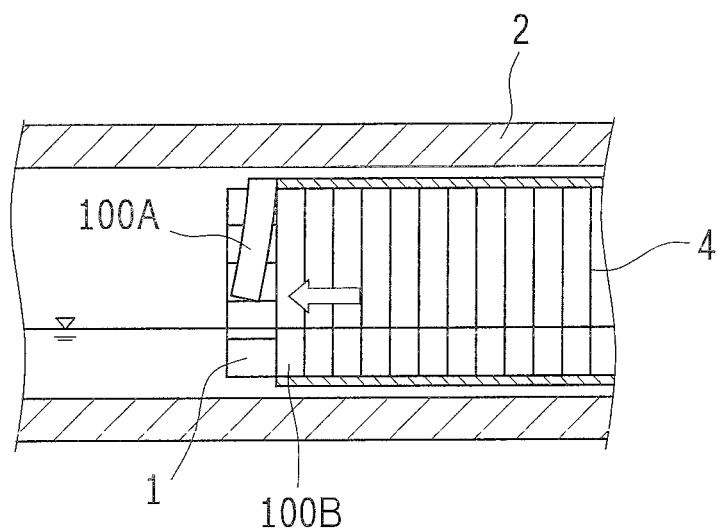
FIG. 4 is a diagram schematically illustrating a problem due to a work condition.
Figure 4B:
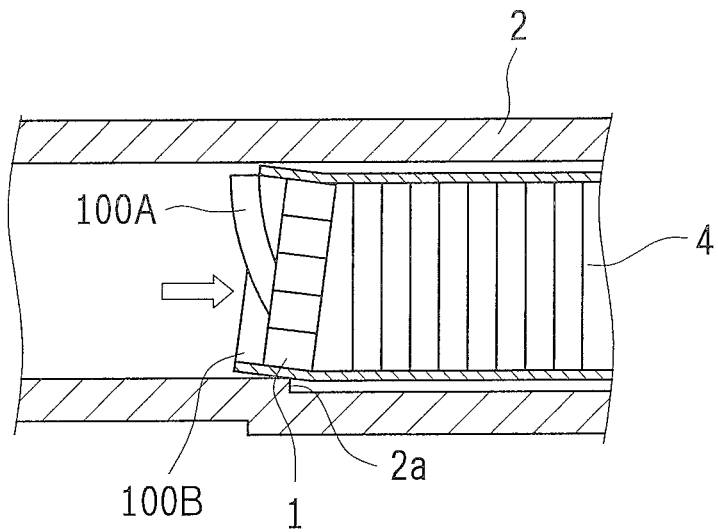

FIG. 4 is a diagram schematically illustrating a problem due to a work condition. FIG. 4(*a*) illustrates a case where the winding machine 1 receives water pressure. FIG. 4(*b*) illustrates a case where the winding machine 1 receives force from a step portion 2*a* of the existing pipe 2. One advantage of the winding machine 1 is that the rehabilitating pipe 3 can be formed from the upstream side toward the downstream side, even when water is flowing in the existing pipe 2 to be rehabilitated. Still, when a large amount of water flows in the existing pipe 2, the winding machine 1 might be moved toward the downstream side by the water pressure as illustrated in FIG. 4(*a*) to be pushed out from the formed pipe member 4. On the other hand, when the existing pipe 2 has the step portion 2*a* or a bent portion, the winding machine 1 might be jammed in the formed pipe member 4 as a result of receiving force from the step portion 2*a* or the bent portion as illustrated in FIG. 4(*b*). When the winding machine 1 is pushed out from or jammed in the formed pipe member 4 as described above, the position of the winding machine 1 relative to the formed pipe member 4 changes in the winding direction. When the position of the winding machine 1 relative to the formed pipe member 4 changes, distance between the end portion of the end portion profile strip 100B in the winding direction front side and the end portion of the newly supplied profile strip 100A in the winding direction rear side fluctuates in the winding direction. Thus, the fitting portions 111 and 112 might be difficult to fit to each other.

In view of the above, the winding machine 1 according to the present embodiment uses the first arm 40 and the second arm 50 to maintain the constant distance in the winding direction between the end portion of the end portion profile strip 100B in the winding direction front side and the end portion of the newly supplied profile strip 100A in the winding direction rear side.

FIG. 2(*a*) is a diagram illustrating the first arm 40 as viewed in a direction indicated by an arrow C in FIG. 1. FIG. 2(*b*) is a diagram illustrating the second arm 50 as viewed in a direction indicated by an arrow D in FIG. 1. As illustrated in FIG. 2(*a*), the first arm 40 includes a first restricting portion 43 in contact with the winding direction front side of the reinforcement member 120 embedded in a reinforcement rib 114 of the end portion profile strip 100B that has been formed into a pipe form, via the end portion profile strip 100B covering the reinforcement member 120. As illustrated in FIG. 2(*b*), the second arm 50 includes a second restricting portion 52 in contact with the winding direction rear side (on the opposite side of the side in contact with the first restricting portion 43) of the reinforcement member 120 of the end portion profile strip 100B that has been formed into a pipe form, via the end portion profile strip 100B covering the reinforcement member 120.

FIG. 3 is a diagram schematically illustrating a relationship among the reinforcement member 120 that has been embedded in the profile strip 100 that has been formed into a pipe form, the first restricting portion 43, and the second restricting portion 52. As described above, the pinch rollers 61, the first arm 40, and the second arm 50 rotate in a clockwise direction (in the direction indicated by the black arrow in FIG. 1) as viewed in the winding direction front side, while maintaining their relative positional relationship. The second restricting portion 52 is constantly in contact with the winding direction rear side of the reinforcement member 120 while the second arm 50 is making a circular movement on the outer side of the end portion profile strip 100B. Thus, when the water pressure acts on the winding machine 1 from the upstream side as indicated by a black arrow in FIG. 3, the reinforcement member 120 is caught by the second restricting portion 52, whereby the winding machine 1 can be prevented from being pushed out from the formed pipe member 4 toward the winding direction front side. The first restricting portion 43 is constantly in contact with the winding direction front side of the reinforcement member 120 while the first arm 40 is making a circular movement on the outer side of the end portion profile strip 100B. Thus, when the winding machine 1 receives force from the step portion 2*a* or the like as indicated by a white arrow in FIG. 3, the reinforcement member 120 is caught by the first restricting portion 43, whereby the winding machine 1 can be prevented from being jammed in the formed pipe member 4.

Furthermore, the first arm 40 and the second arm 50 are disposed at positions away from each other in the circumference direction of the formed pipe member 4. Thus, the first restricting portion 43 and the second restricting portion 52 each serve as rotation resistance against the rotation indicated by an arrow in an arch form illustrated in FIG. 3. Thus, the winding machine 1 can be prevented from rotating in a radial direction relative to the formed pipe member 4.

With these features, the position of the winding machine 1 relative to the formed pipe member 4 in the winding direction is maintained to be constant. Thus, the constant distance in the winding direction is maintained between the end portion of the newly supplied profile strip 100A, supplied while the second arm 50 makes a circular movement on the outer side of the end portion profile strip 100B, on the winding direction rear side and the end portion of the end portion profile strip 100B on the winding direction front side. All things considered, fitting of the fitting portions 111 and 112 can be ensured.

The basic concept of the present embodiment is that the fitting of the fitting portions 111 and 112 is ensured, with the winding machine 1 including the first arm 40 with the first restricting portion 43 and the second arm 50 with the second restricting portion 52 prevented from being pushed out from or being jammed in the formed pipe member 4, as described above. A specific configuration that can implement the basic concept is described below.

—Profile Strip—

The profile strip 100 that is wound by the winding machine 1 according to the present embodiment is described before the structure of the winding machine 1 is described.

Figure 5:
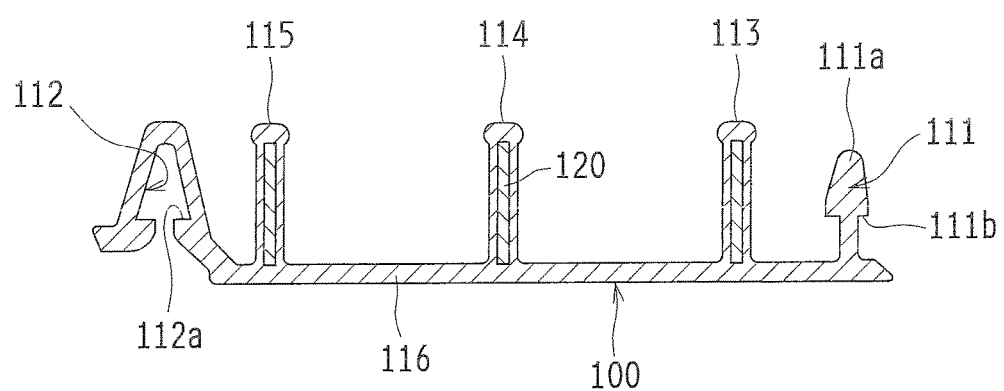
FIG. 5 is a cross-sectional view of a profile strip as an example.

The profile strip 100 is formed of a synthetic resin material, such as hard vinyl chloride, polyethylene, or polypropylene, to be in an elongated shape. As illustrated in FIG. 5, the profile strip 100 includes: a base plate 116 having a strip shape; the fitting portions 111 and 112 as counterparts continuously formed on respective both end portions of the base plate 116; and three reinforcement ribs 113, 114, and 115.

A fitting protrusion 111 as the fitting portion protrudes over the entire length of the profile strip 100 on one surface (outer side surface after the winding) at an end portion of the base plate 116 on the width direction rear side. The fitting protrusion 111 is provided with a distal end portion 111a that has a substantially triangular cross-sectional shape and has a step surface 111b. A fitting recess 112 is the fitting portion as a counterpart of the fitting protrusion 111, and is formed over the entire length of the profile strip 100 at an end portion of the base plate 116 on the width direction front side. The fitting recess 112 is a recess with a substantially triangular cross-sectional shape and has an opening on the other surface side (inner side after the winding) with a narrowed inlet. The fitting recess 112 has a step surface 112a corresponding to the step surface 111b of the fitting protrusion 111.

The reinforcement ribs 113, 114, and 115 are provided for achieving higher rigidity of the profile strip 100, and protrude over the entire length of the profile strip 100 on the one surface of the base plate 116. The reinforcement ribs 113, 114, and 115 are each formed to have an I shaped cross-sectional shape. The reinforcement member 120 that is made of metal and has an elongated shape is embedded in each of the reinforcement ribs 113, 114, and 115. With the reinforcement members 120 thus embedded, the profile strip 100 as a highly rigid self-supporting pipe is formed.

Figure 6A:
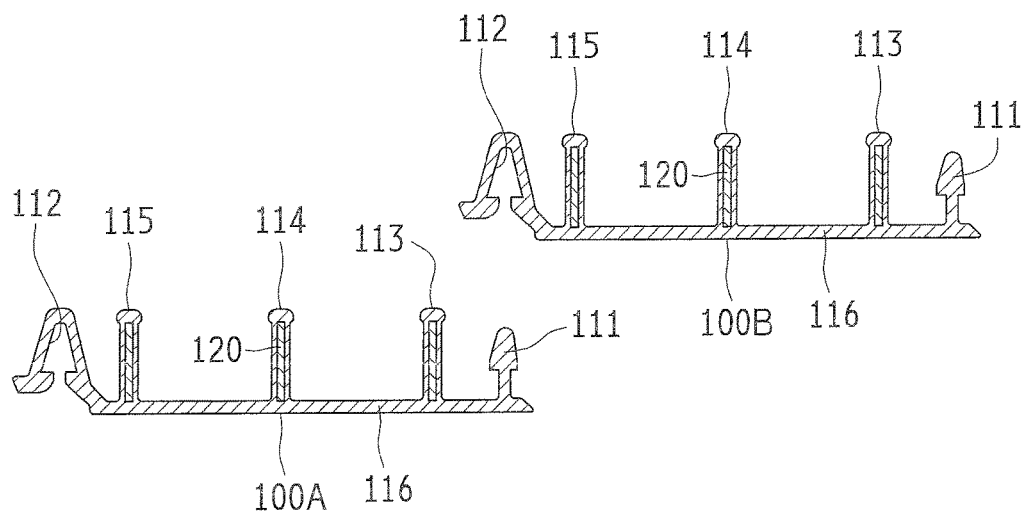
FIG. 6 is a diagram illustrating how fitting portions of the profile strip are fit to each other.
Figure 6B:
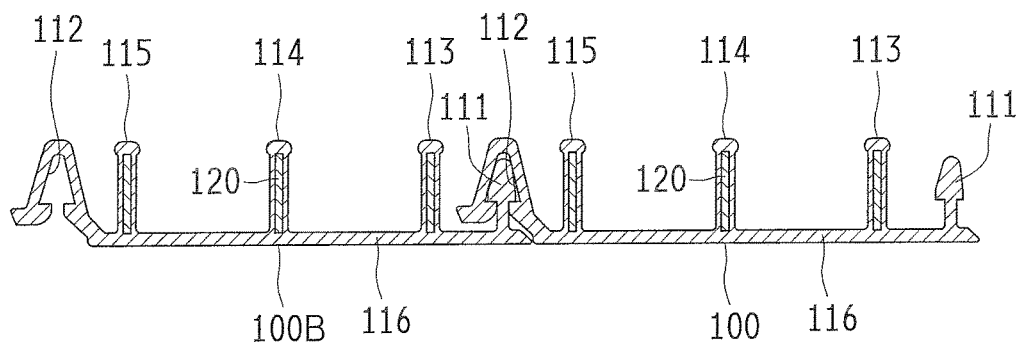

The profile strip 100 thus formed is spirally wound in the winding process, with the end portion profile strip 100B and the newly supplied profile strip 100A disposed adjacent to each other as illustrated in FIG. 6(a). The fitting protrusion 111 of the newly supplied profile strip 100A is fit to the fitting recess 112 of the end portion profile strip 100B from the inner surface side (inner circumference side of the formed pipe member 4). The fitting protrusion 111 that has the distal end portion 111a fit in the fitting recess 112 has the step surface 112a engaged with the step surface 111b, and thus is not easily pulled out. When the fitting protrusion 111 and the fitting recess 112 are thus fit, the newly supplied profile strip 100A newly serves as the end portion profile strip 100B as illustrated in FIG. 6(b).

The profile strip 100 in the winding machine 1 according to the present embodiment may be a member other than the profile strip 100 illustrated in FIG. 5, as long as the fitting portions 111 and 112 and the reinforcement members are provided. For example, a profile strip 10 provided with a reinforcement member 70 as illustrated in FIG. 19 may be employed.

—Overall Configuration of Winding Machine—

Figure 7:
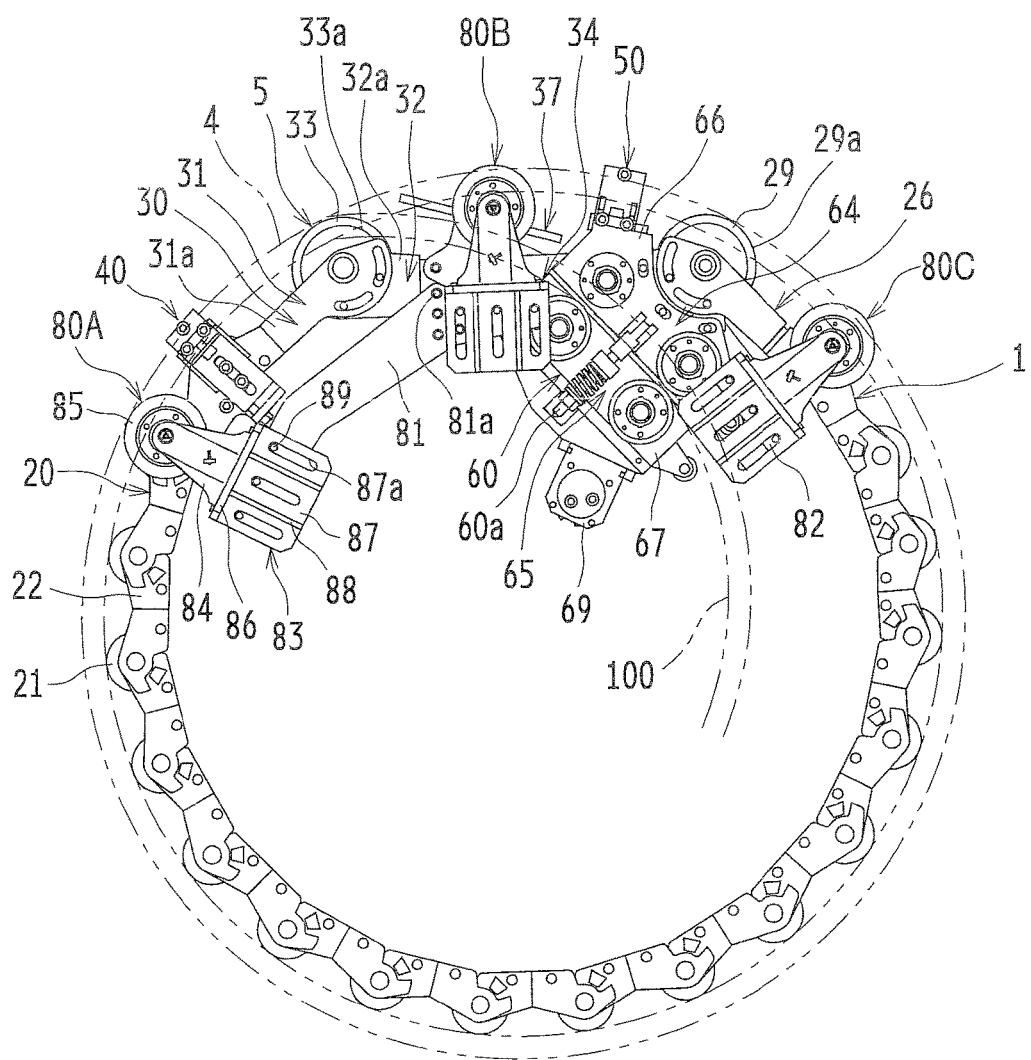
FIG. 7 is a front view of a winding machine.
Figure 8:
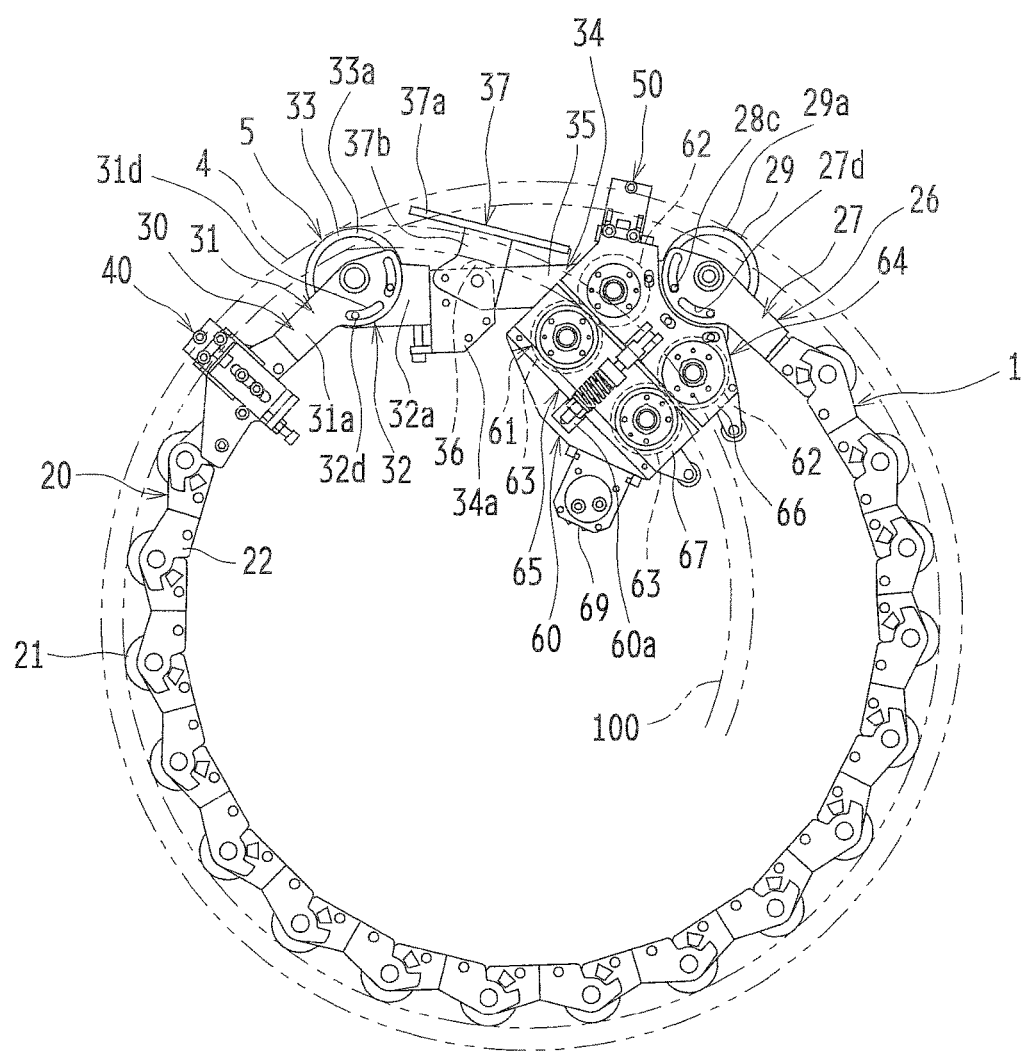
FIG. 8 is a diagram as a result of omitting position restricting wheels in FIG. 7.

FIG. 7 is a front view of the winding machine 1 according to the present embodiment. FIG. 8 is a diagram obtained by omitting first to third position restricting wheels 80A, 80B, and 80C in FIG. 7. The winding machine 1 forms the rehabilitating pipe 3 having a circular cross-sectional shape, and includes: the frame (main body) 20 that has an annular shape and rotatably supports a plurality of link rollers 21; a drive unit 60 that supplies the profile strip 100 from the inner side of the frame 20; the first to the third position restricting wheels 80A, 80B, and 80C; and the first arm 40 and the second arm 50 that are supported by the frame 20. In the description below, an inner side of the annular frame 20 is referred to as a radial direction inner side, and an outer side of the annular frame 20 is referred to as a radial direction outer side. A direction in which an axis of the annular frame 20 extends (direction orthogonal to the sheet plane of FIGS. 7 and 8) is referred to as an axial direction. A side on which the first to the third position restricting wheels 80A, 80B, and 80C are attached is referred to as an axial direction front side, whereas the side opposite to that is referred to as an axial direction rear side. While the winding is in process, the axial direction matches the pipe axial directions of the existing pipe 2 and the formed pipe member 4, and the axial direction front side and the axial direction rear side respectively match the winding direction front and rear sides.

<Frame>

As illustrated in FIG. 8, the frame 20, serving as the main body of the winding machine 1 is formed by coupling a plurality of link members 22 coupled to each other, a first coupling link member 26, a second coupling link member 30, and a supporting frame 34 to each other, and has a substantially annular shape.

Figure 9:
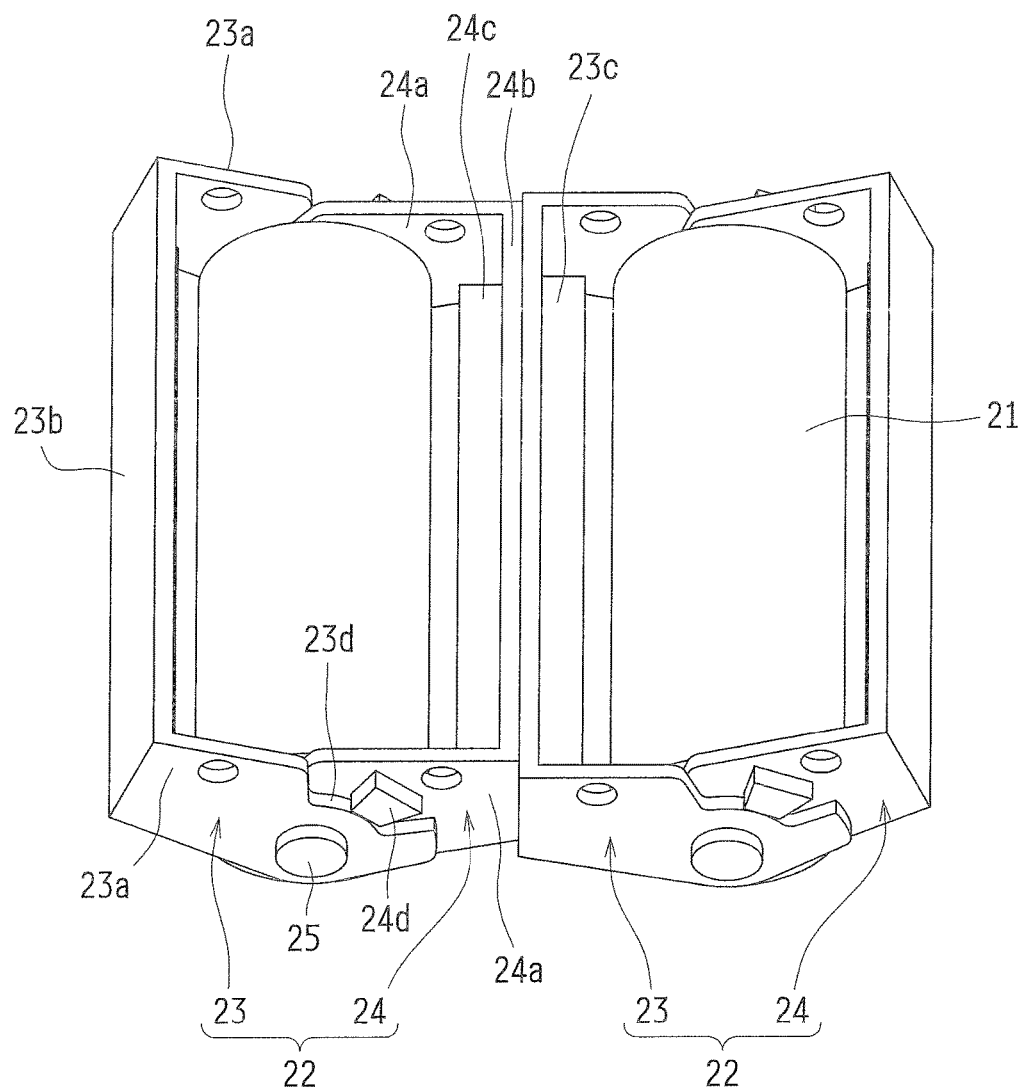
FIG. 9 is a perspective view of link members.

FIG. 9 is a perspective view of the link members 22. The link members 22 are each formed by coupling a pair of link frames 23 and 24 to each other via a coupling shaft 25 as illustrated in FIG. 9. The link frame 23 includes: a pair of link plates 23a that face each other in the axial direction; a coupling plate 23b that couples between the pair of link plates 23a; and a reinforcement plate 23c that couples between the pair of link plates 23a and the coupling plate 23b. A through hole (not illustrated) is formed in an end portion of the link plate 23a on the opposite side of the coupling plate 23b. Similarly, the link frame 24 includes a pair of link plates 24a, a coupling plate 24b, and a reinforcement plate 24c. A through hole (not illustrated) is formed in an end portion of the link plate 24a on the opposite side of the coupling plate 24b.

The link frames 23 and 24 are coupled in such a manner as to be rotatable about the coupling shaft 25, with the distal end portions of the pair of link plates 24a sandwiched by the distal end portions of the pair of link plates 23a in such a manner that the through holes of the four link plates 23a and 24a overlap with each other, and with the coupling shaft 25 inserted in the through holes overlapping with each other. A notch 23d is formed in the distal end portion of the link plate 23a. A rotation restricting portion 24d corresponding to the notch 23d is disposed around the through hole of the link plate 24a. Thus, a bent angle of each of the link members 22 is restricted, so that the link member 22 is not bent after the rotation restricting portion 24d is in contact with a portion defining the notch 23d. The coupling shaft 25 rotatably supports the link roller 21 that has a cylindrical shape and is made of synthetic resin or metal, via a bearing (not illustrated).

The plurality of link members 22 having the configuration described above are coupled to each other as illustrated in FIGS. 7 and 8, with the coupling plate 23b and the coupling plate 24b of the adjacent ones of the link members 22 connected to each other with bolts and nuts (not illustrated). The link rollers 21 are rotatably supported by the link members 22, and rotates while being in contact with the inner side surface of the formed pipe member 4 during forming of the rehabilitating pipe 3.

Figure 10:
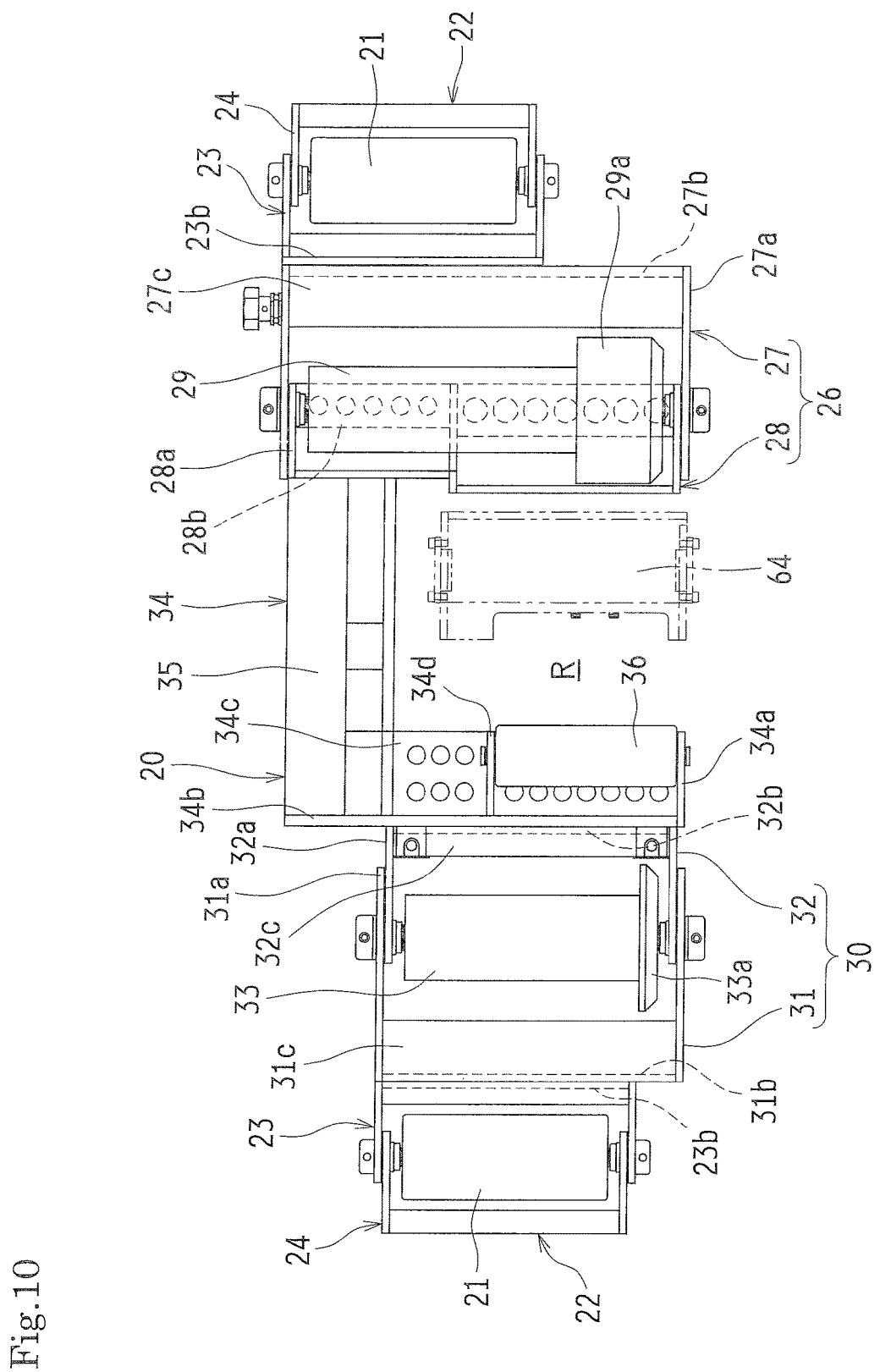
FIG. 10 is a diagram illustrating a part of a frame as viewed from a radial direction outer side.

FIG. 10 is a diagram illustrating the link member 22, the first coupling link member 26, the supporting frame 34, and the second coupling link member 30 in the frame 20 as viewed from the radial direction outer side.

As illustrated in FIG. 10, the first coupling link member 26 is formed with a pair of link frames 27 and 28 coupled to each other with a shaft of a first flanged roller 29. The link frame 27 is longer than the link frames 23 and 24 in the axial direction, and has substantially the same configuration as the link frames 23 and 24. More specifically, the link frame 27 includes a pair of link plates 27a facing each other in the axial direction, a coupling plate 27b, and a reinforcement plate 27c. A through hole (not illustrated) is formed in an end portion of the link plate 27a on the opposite side of the coupling plate 27b. Still, unlike the link plate 23a on which the notch 23d is formed, the link plate 27a is provided with two arch shaped elongated holes 27d (see FIG. 8) formed around the through hole.

The link frame 28 includes: a pair of link plates 28a that have a quarter circle shape and face each other in the axial direction; and a plurality of coupling plates 28b that extend in the axial direction and couple between the pair of link plates 28a. The plurality of coupling plates 28b are disposed to surround the outer circumference of the first flanged roller 29. A through hole (not illustrated) is formed in a portion of the link plate 28a having the quarter circle shape corresponding to the center of the circle. Two protrusions 28c (see FIG. 8) corresponding to the elongated holes 27d are formed around the through holes.

The link frames 27 and 28 are coupled in such a manner as to be rotatable about the shaft of the first flanged roller 29, with the pair of link plates 28a sandwiched by the distal end portions of the pair of link plates 27a in such a manner that the through holes of the four link plates 27a and 28a overlap with each other, and with the shaft of the first flanged roller 29 inserted in the through holes overlapping with each other. A bent angle of the first coupling link member 26 is restricted in such a manner that the first coupling link member 26 is not bent after the protrusion 28c is in contact with an end portion of the elongated hole 27d.

The first coupling link member 26 having the configuration described above is coupled to the plurality of link members 22 coupled to each other, with the coupling plate 27b connected to the coupling plate 23b to an adjacent one of the link members 22 with bolts and nuts (not illustrated). The first flanged roller 29 is rotatably supported by the first coupling link member 26. When the rehabilitating pipe 3 is formed, a flange 29a rotates while being in contact with the winding direction front end of the formed pipe member 4 (end portion profile strip 100B).

As illustrated in FIG. 10, the second coupling link member 30 is formed with a pair of link frames 31 and 32 coupled to each other with a shaft of a second flanged roller 33. The link frame 31 is shorter than the link frame 27 in the axial direction, and has substantially the same configuration as the link frame 27. More specifically, the link frame 31 includes: a pair of link plates 311a that face each other in the axial direction; a coupling plate 31b; and a reinforcement plate 31c. A through hole (not illustrated) is formed in an end portion of the link plate 31a on the opposite side of the coupling plate 31b. Two arch shaped elongated holes 31d (see FIG. 8) are formed around the through hole in the link plate 31a.

The link frame 32 includes: link plates 32a that face each other in the axial direction; a coupling plate 32b that couples between the pair of link plates 32a; and a reinforcement plate 32c that couples between the coupling plate 32b and the pair of link plates 32a. A through hole (not illustrated) is formed in an end portion of the link plate 32a on the opposite side of the coupling plate 32b. Two protrusions 32d (see FIG. 8) corresponding to the elongated holes 31d are formed around the through hole.

The link frames 31 and 32 are coupled in such a manner as to be rotatable about the shaft of the second flanged roller 33, with the pair of link plates 32a sandwiched by the distal end portions of the pair of link plates 31a in such a manner that the through holes of the four link plates 31a and 32a overlap with each other, and with the shaft of the second flanged roller 33 inserted in the through holes overlapping with each other. A bent angle of the second coupling link member 30 is restricted in such a manner that the second coupling link member 30 is not bent after the protrusion 32d is in contact with an end portion of the elongated hole 31d.

The second coupling link member 30 having the configuration described above is coupled to the plurality of link members 22 coupled to each other with the coupling plate 31b connected to the coupling plate 23b of an adjacent one of the link members 22 with bolts and nuts (not illustrated). The second flanged roller 33 is rotatably supported by the second coupling link member 30. When the rehabilitating pipe 3 is formed, a flange 33a rotates while being in contact with the winding direction front end of the formed pipe member 4 (end portion profile strip 100B). The flange 33a is thinner than the flange 29a in the axial direction by an amount corresponding to the width of the profile strip 100. This is because the flange 29a comes into contact with the winding direction front end of the formed pipe member 4 before the newly supplied profile strip 100A is added, and the flange 33a comes into contact with the winding direction front end of the formed pipe member 4 immediately after the newly supplied profile strip 100A is added.

The supporting frame 34 includes: a supporting plate 34a that is substantially flush with the link plates 27a and 31a on the axial direction front side; a link plate 34d that faces the supporting plate 34a in the axial direction; a coupling plate 34b that extends in the axial direction from the end portion of the supporting plate 34a; a reinforcement plate 34c extending in the axial direction; a box shaped frame 35 extending in a direction orthogonal to the coupling plate 34b; and a guide roller 36 that guides the profile strip 100. The box shaped frame 35 is formed of a metal pipe member and the like having a rectangular cross-sectional shape.

The coupling plate 34b connects between an end portion of the supporting plate 34a and an end portion of the box shaped frame 35. The reinforcement plate 34c is connected to the supporting plate 34a and the coupling plate 34b while being orthogonal with respect to the supporting plate 34a and the coupling plate 34b, and is further connected to a bottom surface (inner side surface) of the box shaped frame 35. The link plate 34d is connected to the reinforcement plate 34c and the coupling plate 34b while being orthogonal with respect to the reinforcement plate 34c and the coupling plate 34b. The guide roller 36 is rotatably supported by the supporting plate 34a and the link plate 34d facing each other.

In the supporting frame 34 having the configuration described above, the box shaped frame 35 has an end portion connected to the coupling plate 28b of the first coupling link member 26 by welding and the like, and the coupling plate 34b is connected to the coupling plate 32b of the second coupling link member 30 with bolts and nuts (not illustrated). Thus, the annular frame 20 including the plurality of link members 22, the first coupling link member 26, the supporting frame 34, and the second coupling link member 30 that are coupled to each other is formed. With the box shaped frame 35 provided between the first coupling link member 26 and the second coupling link member 30 as described above, the first coupling link member 26, the second coupling link member 30, and the supporting frame 34 form a substantially C shape as viewed from the radial direction outer side. Thus, as illustrated in FIG. 10, a space R is formed in the frame 20 that communicates between the radial direction inner side and the radial direction outer side of the frame 20. Thus, the profile strip 100 supplied by the drive unit 60 from the radial direction inner side of the frame 20 can pass through the space R to be on the radial direction outer side of the frame 20 to be added to the formed pipe member 4 at the fitting position 5.

As illustrated in FIG. 8, the supporting frame 34 is provided with an outer surface guide 37 that holds the profile strip 100 so that the profile strip 100 that has passed through the space R to be on the radial direction outer side of the frame 20 does not excessively expand outward. The outer surface guide 37 includes: a supporting arm 37b that is fixed to the supporting plate 34a with a bolt; and a rectangular guide plate 37a that is provided to the distal end portion of the supporting arm 37b and is disposed to face the guide roller 36. Thus, the profile strip 100 that has passed through the space R to be on the radial direction outer side of the frame 20 is guided to the fitting position 5 with the guide roller 36 being in contact with the inner side surface of the profile strip 100 and the guide plate 37a holding the outer side surface of the profile strip 100.

<Drive Unit>

Figure 11:
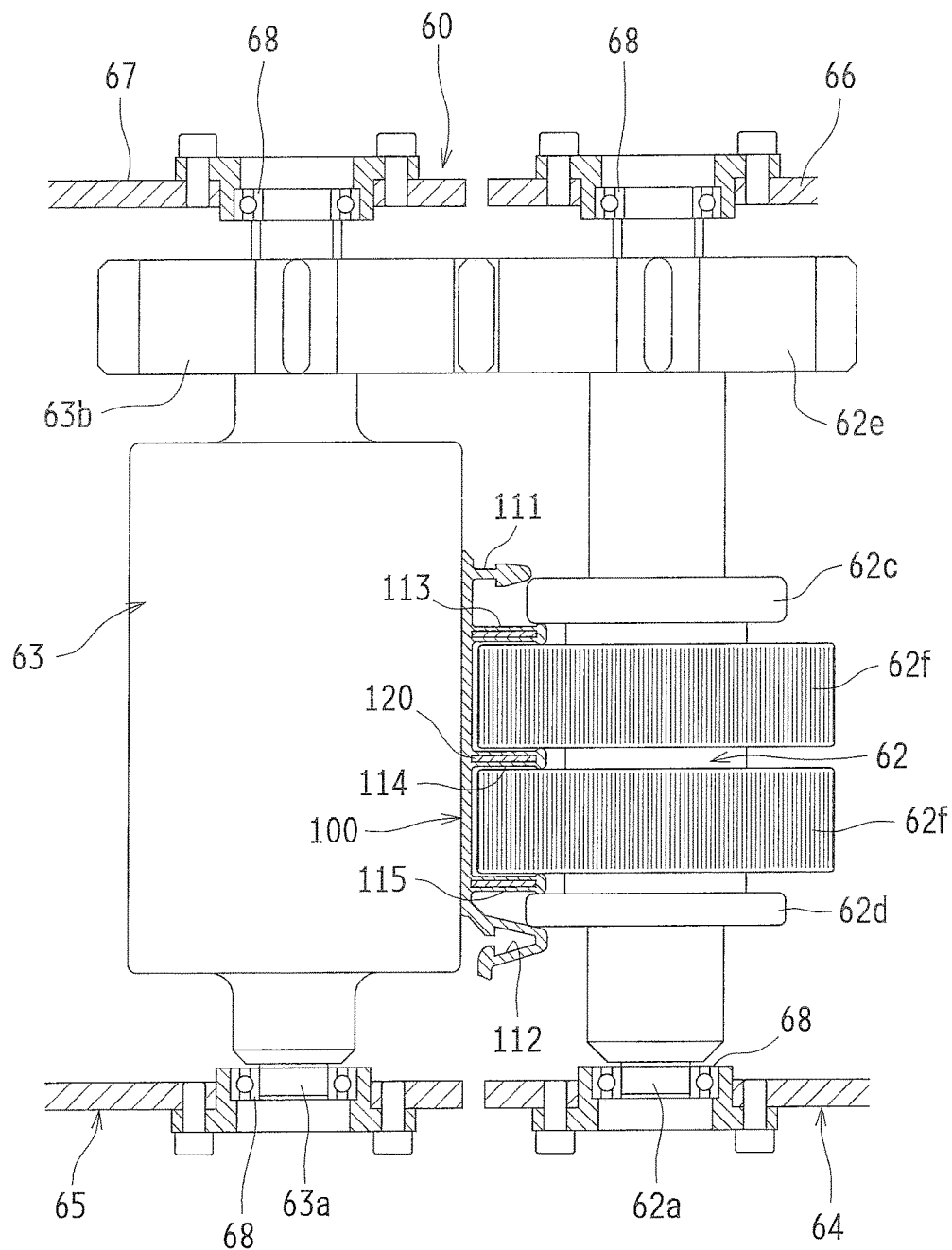
FIG. 11 is a partially cut-out view of a main portion of a drive unit.

FIG. 11 is a partially cut-out view of a main part of the drive unit 60. The drive unit 60 includes two sets of pinch rollers 61 each including a pair of outer roller 62 and inner roller 63 that are drivingly rotated while sandwiching the profile strip 100 as illustrated in FIG. 11. More specifically, the drive unit 60 is formed as a combination of an outer surface unit 64 incorporating the two outer rollers 62 and an inner surface unit 65 incorporating two inner rollers 63.

The outer surface unit 64 includes the outer roller 62 and a casing 66. A rotational shaft 62a of the outer roller 62 is rotatably supported by the casing 66 via a ball bearing 68. The inner surface unit 65 includes the inner roller 63 and a casing 67. A rotational shaft 63a of the inner roller 63 is rotatably supported by the casing 67 via another ball bearing 68.

The outer roller 62 includes: two large diameter portions 62f; a first small diameter portion 62c; and a second small diameter portion 62d. The two large diameter portions 62f are formed to sandwich the reinforcement rib 114 of the profile strip 100 in which the reinforcement member 120 is embedded. The first small diameter portion 62c is formed to sandwich the reinforcement rib 113 of the profile strip 100 with the large diameter portion 62f. The second small diameter portion 62d is formed to sandwich the reinforcement rib 115 of the profile strip 100 with the large diameter portion 62f. Thus, the outer roller 62 rotates without slipping while being in contact with the outer side surface (surface from which the reinforcement ribs 113, 114, and 115 protrude) of the profile strip 100.

The inner roller 63 is formed of a cylindrical member made of synthetic resin or metal, and is formed to have a length in the axial direction longer than the width of the profile strip 100. The inner roller 63 rotates while being in contact with the inner side surface of the profile strip 100.

The drive unit 60 includes a driving motor (not illustrated) that drivingly rotates the outer and the inner rollers 62 and 63. An output shaft of the driving motor is rotatably supported by the casing 67 and has a distal end portion on which gears (not illustrated) are fixed. The gears of the driving motor are respectively in mesh with gears 63b fixed to the rotational shafts 63a of the two inner rollers 63. The two gears 63b are respectively in mesh with gears 62e fixed to the rotational shafts 62a of the two outer rollers 62. The driving force from the driving motor is transmitted to the rotational shafts 62a and 63a of the outer and the inner rollers 62 and 63, after passing through the gears of the driving motor, and the gears 63b and 62e so that appropriate deceleration is achieved. Thus, the outer roller 62 and the inner roller 63 are drivingly rotated in the opposite directions. Thus, the profile strip 100 can be sent by the drive unit 60 while being nipped between the outer and the inner rollers 62 and 63.

Figure 15:
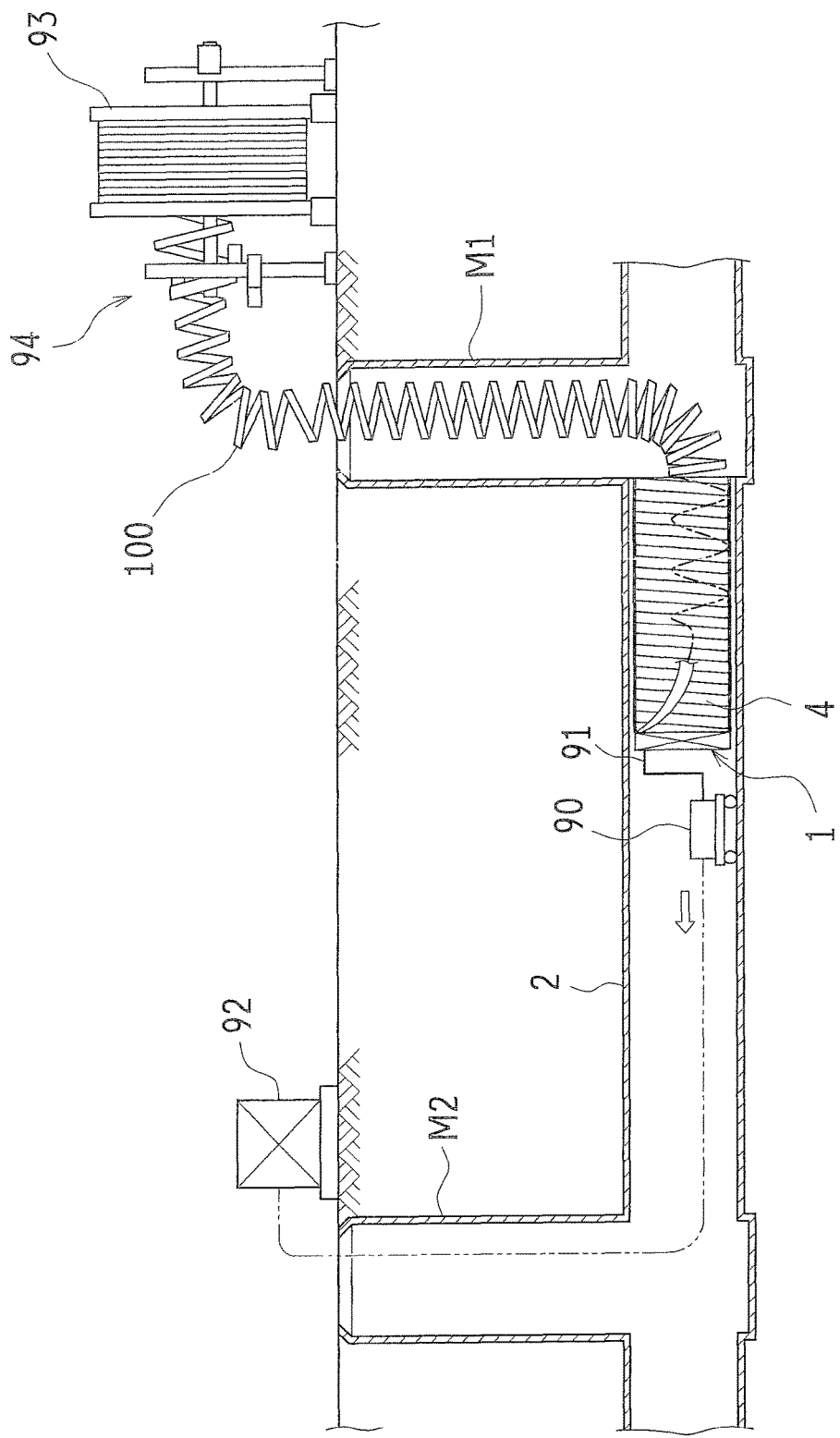
FIG. 15 is a diagram illustrating how devices are arranged when a pipe is formed.

For example, the driving motor is driven by hydraulic oil supplied from a hydraulic unit 90 through a hydraulic hose 91 illustrated in FIG. 15. The hydraulic hose 91 extends from the hydraulic unit 90 and is connected to the driving motor via a rotary joint 69 (see FIG. 8). Thus, the hydraulic oil can be supplied regardless of the rotation of the winding machine 1.

The drive unit 60 having the configuration described above is attached to the radial direction inner side of the frame 20 with the casing 66 of the outer surface unit 64 fixed to the first coupling link member 26 (link plate 28a of the link frame 28 on the axial direction front side) with bolts and nuts (not illustrated) as illustrated in FIG. 8.

The drive unit 60 includes a hinge shaft (not illustrated) that couples between the outer surface unit 64 and the inner surface unit 65 in an openable/closable manner. The outer roller 62 and the inner roller 63 move close to each other when a closing mechanism 60a is closed, and move away from each other when the closing mechanism 60a is opened. Thus, the profile strip 100 can be easily removed from the drive unit 60 with the outer roller 62 separated from the inner roller 63, even when the winding for the rehabilitating pipe 3 is in process.

<Position Restricting Wheel>

As illustrated in FIG. 7, the first to the third position restricting wheels 80A, 80B, and 80C are attached to the axial direction front side of the frame 20. The first to the third position restricting wheels 80A, 80B, and 80C each include: a height adjustment portion 83; a bearing 84 fixed to the height adjustment portion 83; and a wheel 85 that rotates while being in contact with the inner circumference surface of the existing pipe 2 supported by the bearing 84.

The height adjustment portion 83 includes: an adjustment plate 87 that has a substantially rectangular shape and is orthogonal with the axial direction; and a supporting plate 86 that has a substantially rectangular shape and extends toward the axial direction front side from the end portion of the adjustment plate 87 on the radial direction outer side, and is formed to have an L shaped cross-sectional shape. The adjustment plate 87 and the supporting plate 86 are connected to each other via a triangular rib 88. Three elongated holes 87a that extend in the radial direction and are arranged at a predetermined interval are formed on the adjustment plate 87.

The bearing 84 has a base end portion connected to the supporting plate 86 with bolts and nuts (not illustrated) and has a distal end portion rotatably supporting the wheel 85.

The first position restricting wheel 80A is attached to an end portion of the supporting plate 81 that is farther from the drive unit 60. The supporting plate 81 is fixed to the supporting plate 34a of the supporting frame 34 with bolts and nuts 81a. The second position restricting wheel 80B is attached to an end portion of the supporting plate 81 closer to the drive unit 60. The third position restricting wheel 80C is attached to the supporting plate 82 fixed to the casing 66 of the outer surface unit 64.

The position restricting wheels 80A, 80B, and 80C are supported by the supporting plates 81 and 82, with the adjustment plates 87 attached to the supporting plates 81 and 82 with three sets of bolt and nut 89 respectively inserted in the three elongated holes 87*a* formed in the adjustment plate 87. The protruding height of the wheel 85 from the frame 20 of each of the first to the third position restricting wheels 80A, 80B, and 80C can be set by adjusting fastening positions of the three sets of bolt and nut 89 relative to the three elongated holes 87*a*. Thus, in the winding machine 1, the distance between the existing pipe 2 and the formed pipe member 4 can be adjusted by adjusting the fastening positions of the three sets of bolt and nut 89 in the three elongated holes 87*a* in the first to the third position restricting wheels 80A, 80B, and 80C.

<First and Second Arms>

The first arm 40 and the second arm 50 are made of metal, have a flat plate shape, are disposed close to the outer circumference surface of the end portion profile strip 100B, and are arranged in parallel with a tangential direction of the outer circumference surface (to face the outer circumference surface). The first arm 40 and the second arm 50 are supported by the frame 20 to be at positions away from each other in the circumference direction of the frame 20 as illustrated in FIG. 8.

Figure 12B:
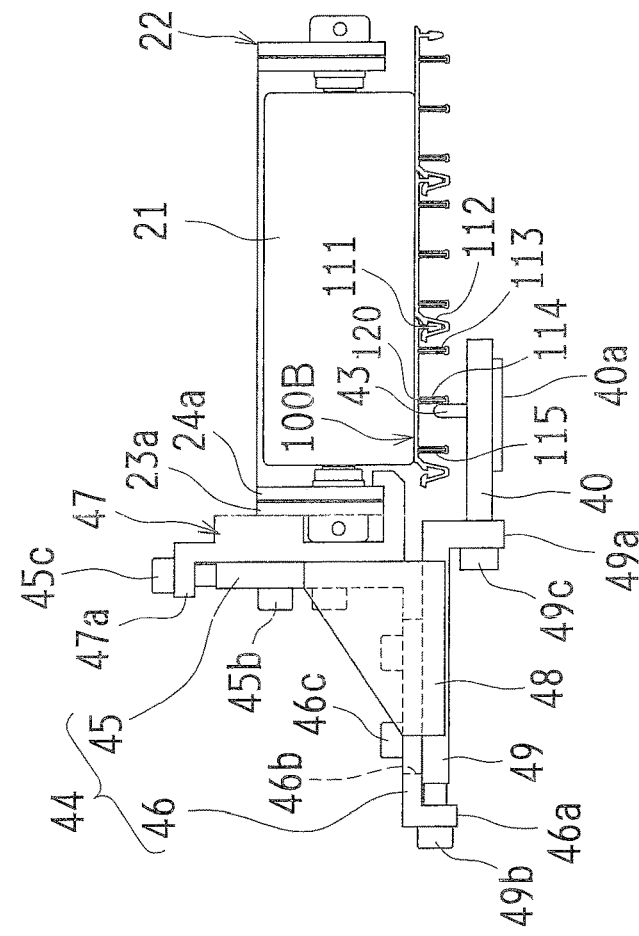
FIG. 12(a) is a front view and FIG. 12(b) is a side view.
Figure 12A:
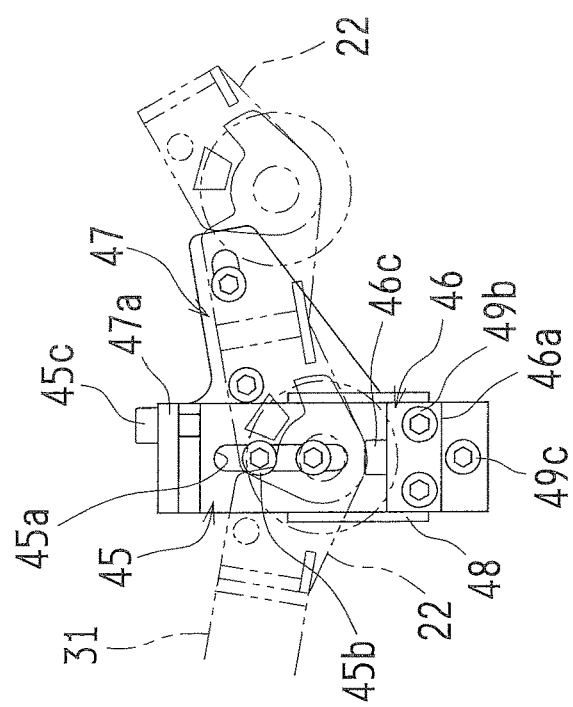

As illustrated in FIG. 12, the first arm 40 is supported by the link member 22 coupled to the link frame 31 of the second coupling link member 30 via a fixing member 47, a first attachment bracket 44, and a slide member 49.

As illustrated in FIG. 12(*b*), the fixing member 47 is fixed to the link member 22 with a bolt while crimping the link plates 23*a* and 24*a* overlapped with each other. A rectangular adjustment wall 47*a* is formed on an end portion of the fixing member 47 on the radial direction inner side, and extends toward the axial direction front side. A through hole (not illustrated) is formed in the adjustment wall 47*a*, has a screw thread formed on an inner circumference surface, and extends in the radial direction.

The first attachment bracket 44 includes: a rectangular fixing wall 45; and a supporting wall 46 extending toward the axial direction front side from an end portion of the fixing wall 45 on the radial direction outer side, and has a substantially L shaped cross-sectional shape. The fixing wall 45 and the supporting wall 46 are connected to each other via a rib 48.

The fixing wall 45 is connected to an adjustment bolt 45*c* screwed in the through hole in the adjustment wall 47*a*. As illustrated in FIG. 12(*a*), an elongated hole 45*a* extending in the radial direction is formed in the fixing wall 45. Two bolts 45*b* inserted in the elongated hole 45*a* are fastened to the fixing member 47. Thus, the fixing wall 45 can move in the radial direction relative to the link member 22 (frame 20). The position of the first attachment bracket 44 in the radial direction can be adjusted by loosening the two bolts 45*b* inserted in the elongated hole 45*a*, moving the fixing wall 45 along the elongated hole 45*a*, fastening the two bolts 45*b*, and then adjusting the distance to the adjustment wall 47*a* with the adjustment bolt 45*c*.

A rectangular adjustment wall 46*a* is formed on an end portion of the supporting wall 46 on the axial direction front side and extends toward the radial direction outer side. Two through holes (not illustrated) are each formed on the adjustment wall 46*a*, have a screw thread formed on the inner circumference surface, and extend in the axial direction. An elongated hole 46*b* extending in the axial direction is formed in the supporting wall 46. Two bolts 46*c* inserted in the elongated hole 46*b* are fastened to the slide member 49.

A rectangular supporting wall 49*a* is formed on an end portion of the slide member 49 on the axial direction rear side, and extends toward the radial direction outer side. A through hole (not illustrated) extending in the axial direction is formed in the supporting wall 49*a*. The slide member 49 is connected to two adjustment bolts 49*b* screwed in the through hole in the adjustment wall 46*a*. Thus, the slide member 49 can move in the axial direction relative to the link member 22 (frame 20). More specifically, the position of the slide member 49 in the axial direction can be adjusted by loosening the two bolts 46*c* inserted in the elongated hole 46*b*, moving the slide member 49 along the elongated hole 46*b*, fastening the two bolts 46*c*, and then adjusting the distance to the adjustment wall 46*a* with the two adjustment bolts 49*b*.

The first arm 40 is fixed to the slide member 49 with the bolt 49*c* inserted in the through hole in the supporting wall 49*a*. As described above, the first arm 40 is attached to the frame 20 via the fixing member 47, the first attachment bracket 44, and the slide member 49, and thus can move in the radial direction and the axial direction relative to the frame 20.

A reinforcement plate 40*a* is attached to the outer side surface of the first arm 40. The first restricting portion 43 is provided to the inner side surface of the first arm 40.

As described above, the first restricting portion 43 restricts the position of the winding machine 1 relative to the formed pipe member 4 in the winding direction. The first restricting portion 43 extends from the inner side surface of the first arm 40 toward the radial direction inner side, and comes into contact with the winding direction front side of the reinforcement member 120 embedded in the reinforcement rib 114 of the end portion profile strip 100B, via the end portion profile strip 100B covering the reinforcement member 120. With the first restricting portion 43 provided as described above, the winding machine 1 that has received force from the step portion 2*a* or the like can be prevented from being jammed in the formed pipe member 4, with the reinforcement member 120 being caught by the first restricting portion 43.

As illustrated in FIG. 13, the second arm 50 is supported by the drive unit 60 via a second attachment bracket 54. The second attachment bracket 54 includes: a rectangular fixing wall 55; and a supporting wall 56 that extends toward the radial direction outer side from an end portion of the fixing wall 55 on the axial direction rear side, and has a substantially L shape. The fixing wall 55 and the supporting wall 56 are connected to each other via a rib 57.

The fixing wall 55 is fastened to an adjustment bolt 66*b* screwed in the through hole (not illustrated) in an adjustment wall 66*a* formed on the casing 66 of the outer surface unit 64. As illustrated in FIG. 13(*a*), an elongated hole 55*a* extending in the axial direction is formed in the fixing wall 55. Two bolts 55*b* inserted in the elongated hole 55*a* are fastened to the casing 66. Thus, the fixing wall 55 can move in the axial direction relative to the frame 20 via the outer surface unit 64. More specifically, the position of the second attachment bracket 54 in the axial direction can be adjusted by loosening the two bolts 55*b* inserted in the elongated hole 55*a*, moving the fixing wall 55 along the elongated hole 55*a*, fastening the two bolts 55*b*, and then adjusting the distance to the adjustment wall 66*a* with the adjustment bolt 66*b*.

The second arm 50 is fixed to the distal end portion of the supporting wall 56 with a bolt 56a inserted in the through hole (not illustrated) formed in the supporting wall 56. The second arm 50 is attached to the frame 20 via the second attachment bracket 54 and the drive unit 60 as described above, and thus can move in the axial direction relative to the frame 20.

A reinforcement plate 50a is attached to the outer side surface of the second arm 50. The second restricting portion 52 is provided to the inner side surface of the second arm 50.

As described above, the second restricting portion 52 restricts the position of the winding machine 1 relative to the formed pipe member 4 in the winding direction. The second restricting portion 52 extends toward the radial direction inner side from the inner side surface of the second arm 50, and comes into contact with the winding direction rear side of the reinforcement member 120 embedded in the reinforcement rib 114 of the end portion profile strip 100B via the end portion profile strip 100B covering the reinforcement member 120. With the second restricting portion 52 provided as described above, the winding machine 1 on which the water pressure acts from the winding direction rear side (upstream side) can be prevented from being pushed out from the formed pipe member 4 toward the winding direction front side, with the reinforcement member 120 being caught by the second restricting portion 52.

A configuration in which the first restricting portion 43 and the second restricting portion 52 are provided to only one of the first arm 40 and the second arm 50 may be employed. In this configuration, the reinforcement member 120 is caught by the first restricting portion 43 when the winding machine 1 receives the force from the step portion 2a or the like, and is caught by the second restricting portion 52 when the water pressure acts on the winding machine 1 from the winding direction rear side (upstream side). Thus, the position of the winding machine 1 relative to the formed pipe member 4 in the winding direction can be restricted. However, in the configuration in which the front and the rear sides of the reinforcement member 120 are sandwiched by the first restricting portion 43 and the second restricting portion 52 at the same position in the circumference direction of the formed pipe member 4, the winding machine 1 might rotate around the radial direction about the first restricting portion 43 and the second restricting portion 52 (see the arrow in the arch form in FIG. 3).

In view of this, in the present embodiment, the first arm 40 and the second arm 50 are disposed at positions away from each other in the circumference direction of the frame 20, and are respectively provided with the first restricting portion 43 and the second restricting portion 52. Thus, the position of the winding machine 1 relative to the formed pipe member 4 in the winding direction can be restricted, and furthermore, the winding machine 1 can be prevented from rotating around the radial direction. With the displacement of the winding machine 1 with respect to the formed pipe member 4 thus prevented, the fitting protrusion 111 on the width direction rear side of the newly supplied profile strip 100A and the fitting recess 112 on the width direction front side of the end portion profile strip 100B can be certainly be fit with each other with a constant distance there between maintained in the winding direction.

<Curl-Forming Device>

Figure 14:
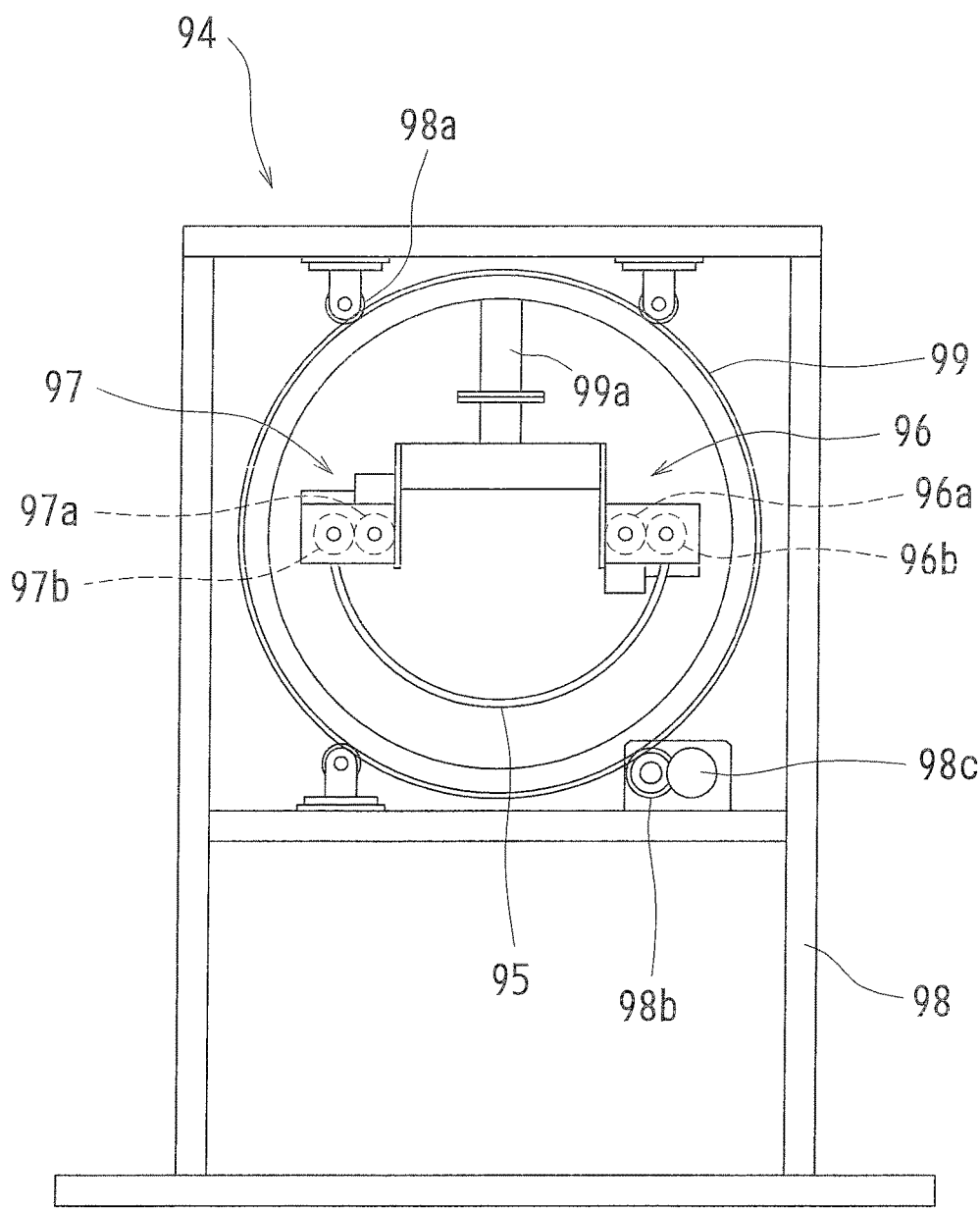
FIG. 14 is a front view of a curl-forming device.

Preferably, the profile strip 100 is curved in advance by a curl-forming device 94 illustrated in FIG. 14 so that the winding operation can be smoothly performed by the winding machine 1.

The curl-forming device 94 includes: a curl guide 95 that is formed in a spiral shape and made of steel; a first feed roller 96 disposed on the upstream side of the curl guide 95; a second feed roller 97 disposed on the downstream side of the curl guide 95; and a supporting frame 98.

The supporting frame 98 rotatably supports a rotational frame 99 having a ring shape via a supporting roller 98a, and drivingly rotates the rotational frame 99 via a driving roller 98b and a driving motor 98c. The first feed roller 96 and the second feed roller 97 are attached to the rotational frame 99 via an attachment bracket 99a. The curl guide 95 is disposed while extending between the first feed roller 96 and the second feed roller 97.

The curl guide 95 is a spiral plate that is formed to have a substantially semi-circular shape having a curvature radius that is substantially the same as the outer diameter of the rehabilitating pipe 3. With the curl guide 95, the sequentially supplied profile strips 100 in which the reinforcement member 120 is embedded are guided along the inner circumference surface of the spiral plate over substantially the half circle. Thus, the profile strip 100 is plastically deformed in the spiral form to be curved with the curvature radius corresponding to the curvature radius of the curl guide 95.

The first feed roller 96 includes a first inner roller 96a and a first outer roller 96b that are rotated in opposite directions by a hydraulic motor (not illustrated), so that the profile strip 100 is pushed toward the curl guide 95 while being nipped between the first inner roller 96a and the first outer roller 96b. The second feed roller 97 includes a second inner roller 97a and a second outer roller 97b that are rotated in opposite directions by a hydraulic motor (not illustrated), so that the profile strip 100 is pulled out from the curl guide 95 while being nipped between the second inner roller 97a and the second outer roller 97b.

In the curl-forming device 94, when the driving motor 98c is driven, the driving roller 98b rotates, and thus the rotational frame 99 rotates in a direction opposite to the rotation direction of the driving roller 98b. Thus, the curl guide 95, the first feed roller 96, and the second feed roller 97 attached to the rotational frame 99 also rotate in this direction. In this process, the rotational frame 99 is rotated in the direction opposite to the supplying direction of the profile strip 100, and at the same speed as the supplying speed. As a result, the profile strip 100 in the spiral form thus fed to the formed pipe member 4 would not be too short or too long, whereby the profile strip 100 in which the reinforcement member 120 is embedded is prevented from being twisted.

For example, as illustrated in FIG. 15, the winding machine 1 having the configuration described above is disposed in a manhole M1 in communication with the existing pipe 2. A drum 93 and the curl-forming device 94 are disposed close to the manhole M1. When the hydraulic unit 90 receives power from a generator 92 disposed close to a manhole M2 to be driven, the driving motor receives the hydraulic oil via the hydraulic hose 91 to be driven. When the driving motor is driven, the profile strip 100 supplied by the pinch rollers 61 passes through the space R to be on the radial direction outer side of the frame 20. The profile strip 100 on the radial direction outer side of the frame 20 passes between the guide roller 36 and the guide plate 37a to be guided to the fitting position 5. The newly supplied profile strip 100A guided to the fitting position 5 has a width direction rear end portion pressed against the winding direction front end portion of the formed pipe member 4 from the inner side for example, whereby the fitting protrusion 111 is fit to the fitting recess 112. Thus, the profile strip 100 is additionally formed at the winding direction front end of the formed pipe member 4. The frame 20 is rotated in the direction opposite to the feed direction, along the inner circumference surface of the formed pipe member 4 due to the counter force generated when the profile strip 100 is fed by the pinch rollers 61. Then, the flange 29a of the first flanged roller 29 and the flange 33a of the second flanged roller 33 rotate while being in contact with the winding direction front end of the formed pipe member 4 (end portion profile strip 100B). The winding machine 1 advances with the flange 29a and the flange 33a being in contact with the end portion profile strip 100B additionally formed at the winding direction front end of the formed pipe member 4, while the frame 20 is rotating.

—Modification—

In the first embodiment, the first arm 40 and the second arm 50 are disposed and are respectively provided with the first restricting portion 43 and the second restricting portion 52. In the present modification, the first arm 40 is omitted with the flange 29a of the first flanged roller 29 functioning on behalf of the first restricting portion 43.

More specifically, in the present modification, the flange 29a of the first flanged roller 29 rotates while being in contact with the winding direction front end of the formed pipe member 4 so that the winding machine 1 is prevented from being jammed in the formed pipe member 4. The second arm 50 is provided with the second restricting portion 52, whereby the winding machine 1 can be prevented from being pushed out from the formed pipe member 4 toward the winding direction front side. The first flanged roller 29 and the second arm 50 are disposed at positions away from each other in the circumference direction of the frame 20. Thus, the winding machine 1 can be prevented from rotating around the radial direction. As described above, in the present modification, the first arm 40 is omitted, whereby the advantageous effect that is the same or similar to that in the first embodiment described above can be obtained with a structure of the winding machine 1 more simplified.

A combination of the flange 33a of the second flanged roller 33 and the second restricting portion 52 of the second arm 50 may function on behalf of the first flanged roller 29. Furthermore, the second arm 50 may be omitted with a restricting portion, coming into contact with the winding direction rear side of the reinforcement member 120, provided to the first arm 40 and used in combination with the first flanged roller 29 or the second flanged roller 33.

Second Embodiment

In the first embodiment described above, the first arm 40 and the second arm 50 are used to address the problem due to the work condition involving the water pressure of the water flowing in the existing pipe 2 and the step portion 2a of the existing pipe 2. In the present embodiment, the first arm 40 and the second arm 50 are mainly used for engaging an engagement rib 14 with a reinforcement rib 13. More specifically, the present embodiment provides a solution for a situation where a fitting recess 12 and a fitting protrusion 11 are fit with each other but the engagement rib 14 and the reinforcement rib 13 do not engage with each other, as illustrated in FIG. 20(c). The present embodiment is described below with description on a portion common to the first embodiment omitted as appropriate.

In the description below, the fitting recess 12 and the fitting protrusion 11 as counterparts respectively formed on both end portions of the profile strip 10 in the width direction are referred to as main locks in some cases, and the reinforcement rib 13 and the engagement rib 14 that are provided to the profile strip 10 and engage with each other are referred to as sub locks, provided in addition to the main lock, in some cases.

Figure 16:
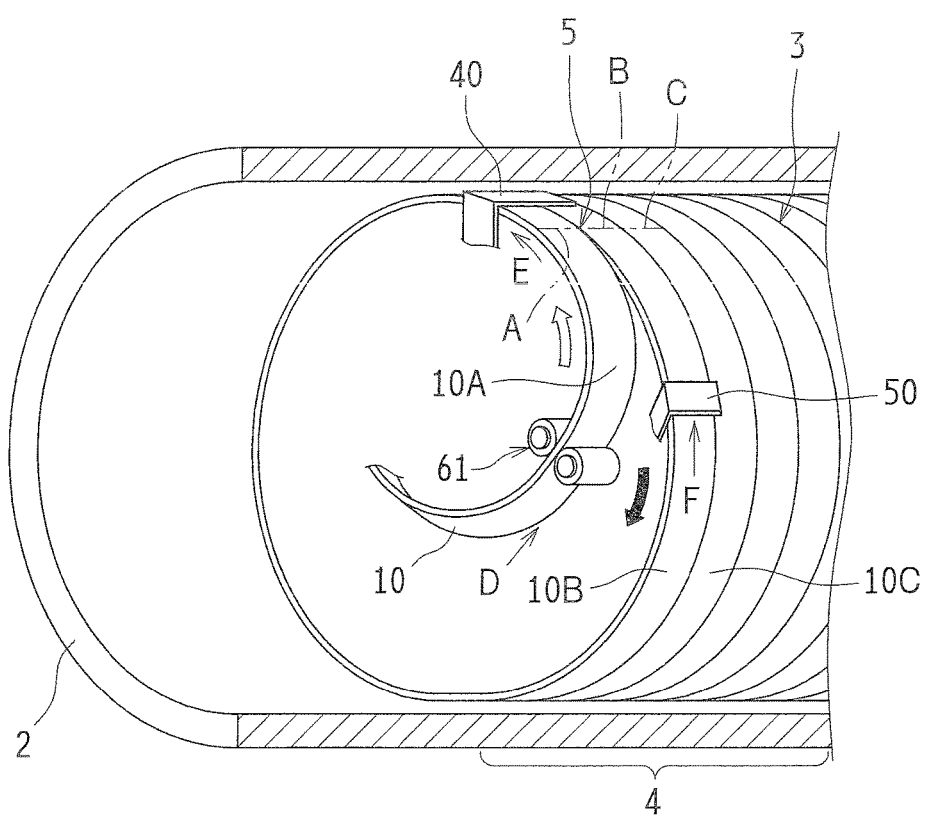
FIG. 16 is a diagram schematically illustrating a basic concept of a second embodiment of the present invention.

The basic concept of the present embodiment is described before a device configuration of the winding machine 1 and the like are described, so that the present embodiment can be more easily understood. FIG. 16 to FIG. 18 are each a diagram schematically illustrating the basic concept of the present embodiment. In FIG. 16, only a part of the winding machine 1 involving the pinch rollers 61, the first arm 40, and the second arm 50 for supplying the profile strip 10 is illustrated for the sake of illustration. In the description below, a left side in FIG. 16 that is a downstream side of water flowing in the existing pipe 2 is defined as a winding direction front side. A right side in FIG. 16 that is an upstream side of the water flowing in the existing pipe 2 is defined as a winding direction rear side.

As illustrated in FIG. 17, the elongated profile strip 10 spirally wound to form the rehabilitating pipe 3 in the present embodiment has the fitting portions 11 and 12 as counterparts continuously formed on the respective both end portions in the width direction, and the reinforcement rib 13 and engagement rib 14. The winding machine 1 is configured to supply the profile strip 10 in the direction of a white arrow in FIG. 16 in the existing pipe 2 with the pinch rollers 61, while pressing the fitting portion 11 on the width direction rear side (matches with the winding direction rear side) of a profile strip 10A that is newly supplied toward the fitting portion 12 on the width direction front side (matches with the winding direction front side) of a profile strip 10B that is one of the profile strips 10 formed into a pipe form and is positioned at the winding direction front end, from the inner side. Thus, the fitting portions 11 and 12 are fit to each other. Furthermore, the engagement rib 14 and the reinforcement rib 13 are engaged with each other.

It is to be noted that the "profile strips 10 that have been formed into a pipe form" represents the profile strips 10 each having at least the fitting portion 11 on the width direction rear side fit, and corresponds to a portion denoted by a reference numeral 4 in FIG. 16. Hereinafter, the "profile strips 10 that have been formed into a pipe form" are also referred to as the formed pipe member 4.

In the description below, the "first end portion profile strip 10B" is one of the profile strips 10 that is positioned at the winding direction front end of the formed pipe member 4, and corresponds to a portion extending in a supplying direction (white arrow) of the profile strip 10 in FIG. 16 to form a loop from the virtual line A to the virtual line B.

Furthermore, a "second end portion profile strip 10C" is one of the profile strip 10 that is adjacent to and on the winding direction rear side of the first end portion profile strip 10B, and corresponds to a portion extending in the supplying direction of the profile strip 10 in FIG. 16 to form a loop from the virtual line B to the virtual line C.

Furthermore, the "profile strip 10A that is newly supplied" corresponds to a portion extending in the supplying direction of the profile strip 10 in FIG. 16 from the pinch rollers 61 to the virtual line A. The "profile strip 10A that is newly supplied" is hereinafter also referred to as a newly supplied profile strip 10A.

The newly supplied profile strip 10A, the first end portion profile strip 10B, and the second end portion profile strip 10C are names given to portions of the profile strips 10 having an elongated shape for convenience of explanation, and do not refer to different members.

The "fitting position" is denoted with a reference numeral 5 in FIG. 16 and is a position where the fitting portion 11 of the newly supplied profile strip 10A on the winding direction rear side and the fitting portion 12 of the first end portion profile strip 10B on the winding direction front side that have been separated from each other start to fit with each other.

As illustrated in FIG. 16, the pinch roller 61, the first arm 40, and the second arm 50 are arranged in this order in the supplying direction of the profile strip 10. The winding machine 1 moves forward while rotating in a direction indicated by a black arrow in FIG. 16 while maintaining the relative positional relationship among the pinch rollers 61, the first arm 40, and the second arm 50. The first arm 40 and the second arm 50 make a circular movement between the formed pipe member 4 and the existing pipe 2 in accordance with the rotation of the frame 20.

The newly supplied profile strip 10A is added to the winding direction front end portion of the formed pipe member 4 including the profile strips 10 that have been spirally wound in accordance with the rotation and the forward movement of the winding machine 1. The virtual lines A, B, and C in FIG. 16 move in accordance with the movement of the fitting position 5 in a spiral trajectory. In other words, the fitting position 5 moves while drawing the spiral trajectory with the relative positional relationship with respect to the first end portion profile strip 10B and the second end portion profile strip 10C maintained, and the portions of the first end portion profile strip 10B and the second end portion profile strip 10C in the formed pipe member 4 change along the movement. More specifically, the "newly supplied profile strip 10A" on the front side (side of the pinch roller 61) of the fitting position 5 becomes the "first end portion profile strip 10B" once the fitting portions 11 and 12 are fit to each other at the fitting position 5, and at the same time, a part of the profile strip that is used to be the "first end portion profile strip 10B" becomes the "second end portion profile strip 10C".

In each of FIG. 17(*a*) to FIG. 17(*d*), a middle diagram is a diagram illustrating the pinch roller 61 as viewed in a direction indicated by an arrow D in FIG. 16. An upper diagram is a diagram illustrating the first arm 40 as viewed in a direction indicated by an arrow E in FIG. 16. A lower diagram is a diagram illustrating the second arm 50 as viewed in a direction indicated by an arrow F in FIG. 16. In FIG. 17(*a*) to FIG. 17(*d*), the profile strip 10 that has passed through the pinch rollers 61 before the state illustrated in FIG. 17(*a*) is achieved is illustrated with a broken line, and the profile strip 10 that has passed through the pinch rollers 61 after the state illustrated in FIG. 17(*a*) is achieved is illustrated with a solid line.

FIG. 18 is a schematic diagram obtained by viewing the formed pipe member 4 and the winding machine 1 that rotates in the clockwise direction, as viewed from the winding direction front side. FIG. 18(*a*) to FIG. 18(*d*) respectively correspond to FIG. 17(*a*) to FIG. 17(*d*). In FIG. 18(*a*) to FIG. 18(*d*), the profile strip 10 before reaching a virtual start position S is illustrated with a broken line, and the profile strip 10 supplied at the start position S or after is illustrated with a solid line. In FIG. 18(*d*), the second end portion profile strip 10C that is overlapped with the first end portion profile strip 10B in the actual view is illustrated to be on the outer side of the first end portion profile strip 10B.

The relationship between the profile strip 10 illustrated in the solid line and the first and the second arms 40 and 50 is described below with reference to FIGS. 17 and 18.

As illustrated in FIG. 17(*a*), the newly supplied profile strip 10A supplied from the pinch rollers 61 has the fitting portions 11 and 12 fit at the fitting position 5 (start position S) as illustrated in FIG. 18(*a*). The fitting position 5, the pinch rollers 61, the first arm 40, and the second arm 50 rotate in the clockwise direction (the direction indicated by the black arrow) as viewed from the winding direction front side with their relative positional relationship maintained.

Then, the newly supplied profile strip 10A becomes the first end portion profile strip 10B when the fitting portions 11 and 12 fit at the fitting position 5 as illustrated in FIG. 18(*b*). The first arm 40 close to the fitting position 5 passes through the radial direction outer side of the first end portion profile strip 10B in such a manner as to chase the fitting position 5 as illustrated in FIG. 17(*b*).

Then, when the fitting position 5 approaches the start position S as a result of rotating in the clockwise direction as viewed from the winding direction front side as illustrated in FIG. 18(*c*), the second arm 50 starts to pass through the radial direction outer side of the first end portion profile strip 10B. In this process, the second restricting portion 52 extending from the second arm 50 toward the first end portion profile strip 10B comes into contact with the winding direction rear side of an expanded portion 71 of the reinforcement member 70 mounted to the first end portion profile strip 10B as illustrated in FIG. 17(*c*).

The second restricting portion 52 is constantly in contact with the expanded portion 71 while the second arm 50 is rotating on the radial direction outer side of the first end portion profile strip 10B. Thus, when the water pressure acts on the winding machine 1 from the winding direction rear side for example, the reinforcement member 70 is caught by the second restricting portion 52, whereby the winding machine 1 can be prevented from being pushed out from the formed pipe member 4 toward the winding direction front side. The position of the winding machine 1 relative to the formed pipe member 4 is restricted with the second restricting portion 52 being in contact with the reinforcement member 70 of the first end portion profile strip 10B. Thus, the constant distance can be maintained between the winding direction rear side end portion of the newly supplied profile strip 10A supplied while the second arm 50 is rotating on the radial direction outer side of the first end portion profile strip 10B and the winding direction front side end portion of the first end portion profile strip 10B.

Then, when the fitting position 5 passes through the start position S as a result of rotating in the clockwise direction as viewed from the winding direction front side as illustrated in FIG. 18(*d*), the profile strip that is used to be the newly supplied profile strip 10A becomes the first end portion profile strip 10B, and at the same time, a part of the profile strip that is used to be the first end portion profile strip 10B becomes the second end portion profile strip 10C. Also in FIG. 18(*d*), the second arm 50 rotates on the outer side of the first end portion profile strip 10B, and the constant distance is maintained between the winding direction rear side end portion of the newly supplied profile strip 10A and the winding direction front side end portion of the first end portion profile strip 10B. Thus, the fitting between the fitting portions 11 and 12 is ensured at the fitting position 5.

At the timing when (or immediately after) the fitting of the main lock is achieved at the fitting position 5, as illustrated in FIG. 17(*d*), the first arm 40 starts to pass through the outer side of the newly defined first end portion profile strip 10B. In this process, a first guide portion 41 diagonally extending toward the first end portion profile strip 10B from the first arm 40 comes into contact with the engagement rib 14 of the second end portion profile strip 10C, to fit (press) the engagement rib 14 in the reinforcement rib 13 of the first end portion profile strip 10B. In this manner, the reinforcement rib 13 of the first end portion profile strip 10B and the engagement rib 14 of the second end portion profile strip 10C can be engaged with each other.

Figure 17B:
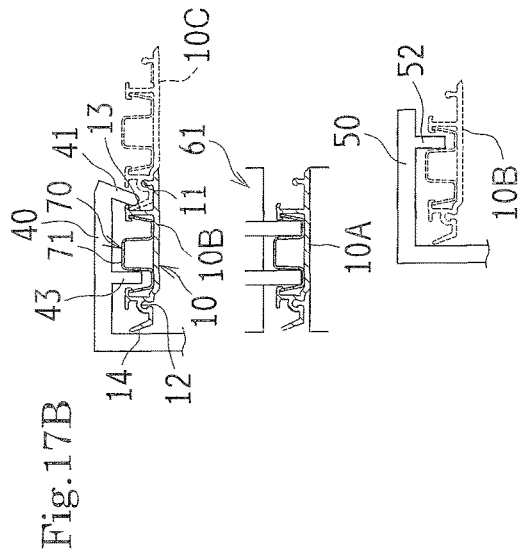
FIG. 17 is a diagram schematically illustrating the basic concept of the second embodiment.
Figure 17D:
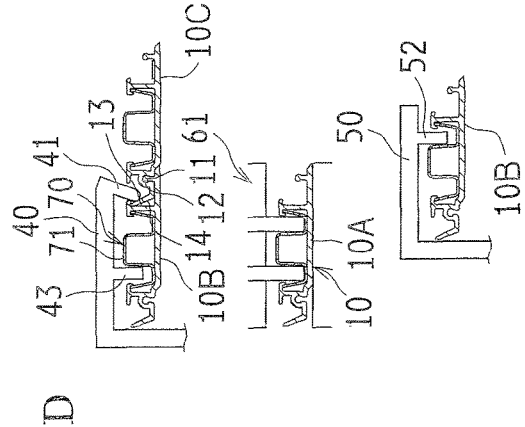
Figure 17A:
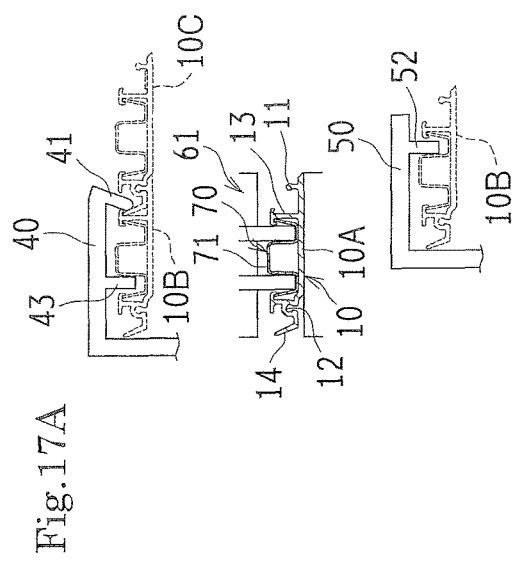
Figure 17C:
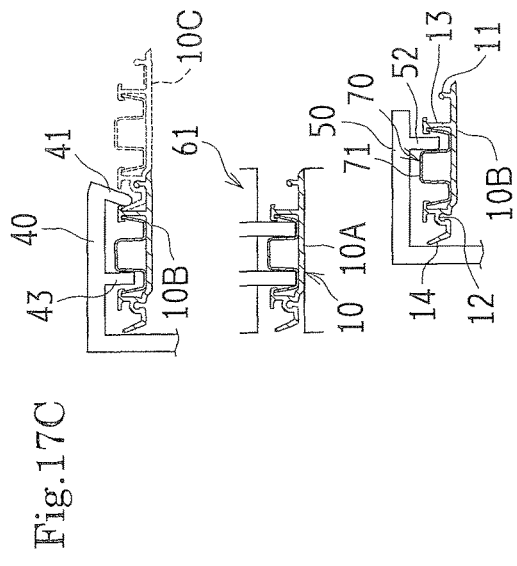
Figure 18B:
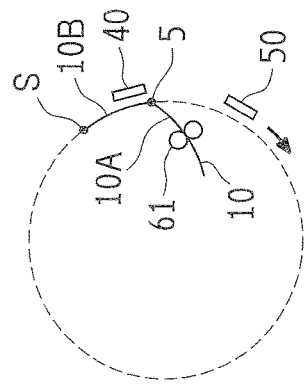
FIG. 18 is a diagram schematically illustrating the basic concept of the second embodiment.
Figure 18D:
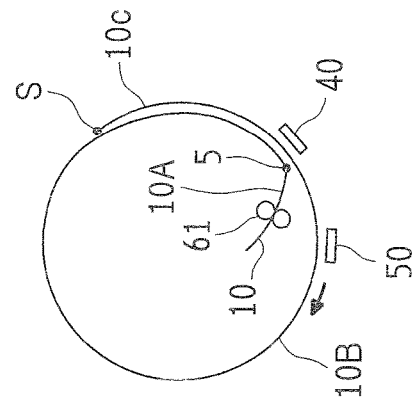
Figure 18A:
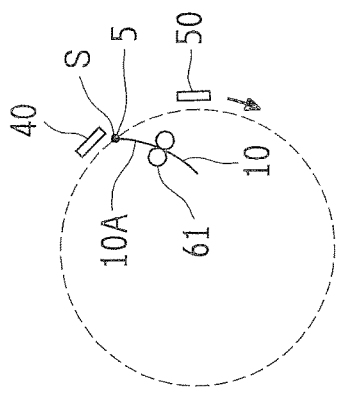
Figure 18C:
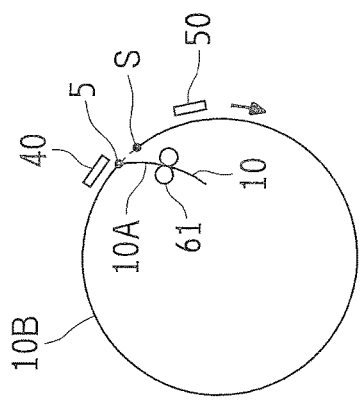

When the engagement rib 14 of the second end portion profile strip 10C is pressed against the reinforcement rib 13 of the first end portion profile strip 10B, the second end portion profile strip 10C attempts to move toward the winding direction front side (left side in FIG. 17(d)). When the second end portion profile strip 10C attempts to move toward the winding direction front side at a portion close to the fitting position 5, the first end portion profile strip 10B to subsequently become the second end portion profile strip 10C attempts to move toward the winding direction front side at a portion on the front side of the fitting position 5. As a result, the distance in the winding direction between the winding direction front side end portion of the first end portion profile strip 10B and the winding direction rear side end portion of the newly supplied profile strip 10A fluctuates. Thus, the fitting of the main locks is difficult to achieve.

In the present embodiment, as illustrated in FIG. 17(d), the first restricting portion 43, extending from the first arm 40 toward the first end portion profile strip 10B, is in contact with the winding direction front side of the expanded portion 71 of the reinforcement member 70 mounted to the first end portion profile strip 10B. Thus, the movement of the second end portion profile strip 10C toward the winding direction front side at a portion close to the fitting position 5 can be prevented with the reinforcement member 70 and the first end portion profile strip 10B. Thus, the first end portion profile strip 10B to subsequently become the second end portion profile strip 10C is prevented from moving at a portion in front of the fitting position 5. Thus, the constant distance in the winding direction can be maintained between the winding direction front side end portion of the first end portion profile strip 10B and the winding direction rear side end portion of the newly supplied profile strip 10A, whereby the smooth fitting of the main locks can be achieved.

As described above, the basic concept of the present embodiment is that the engagement of the sub locks and the fitting of the main locks are achieved with the winding machine 1 including: the first arm 40 including the first guide portion 41 and the first restricting portion 43; and the second arm 50 including the second restricting portion 52. When small or no water pressure acts on the winding machine 1 from the upstream side, the engagement of the sub locks and the fitting of the main locks can be achieved with the winding machine 1 including the first arm 40 including the first guide portion 41 and the first restricting portion 43. A specific configuration with which the basic concept can be implemented is described below.

—Profile Strip—

First of all, the profile strip 10 that is wound by the winding machine 1 according to the present embodiment is described.

Figure 19A:
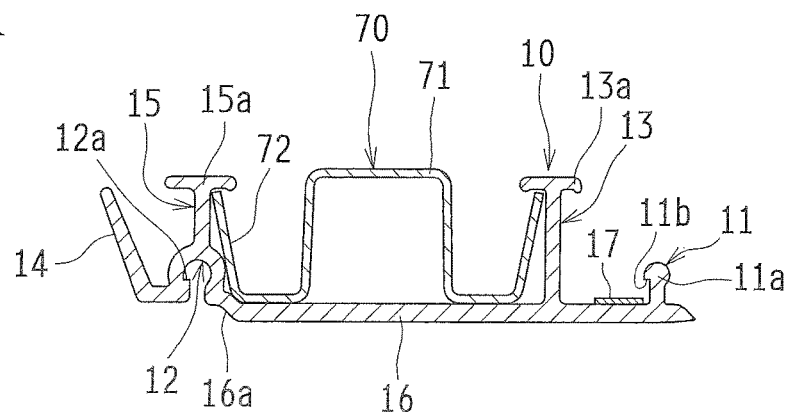
FIG. 19 is a cross-sectional view of a profile strip as an example.

The profile strip 10 is formed of a synthetic resin material, such as hard vinyl chloride, polyethylene, or polypropylene, to be in an elongated shape. As illustrated in FIG. 19(a), the profile strip 10 includes: a base plate 16 having a strip shape; the fitting portions 11 and 12 as counterparts respectively formed on both end portions of the base plate 16 in the width direction; reinforcement ribs 13 and 15; and the engagement rib 14. A seal that is attached to the base plate 16 and is made of an elastic material such as rubber or elastomer for example, is denoted with a reference numeral 17.

The fitting protrusion 11 as the fitting portion protrudes over the entire length of the profile strip 10 on one surface (outer side surface at the time of winding) at an end portion of the base plate 16 on the width direction rear side (matches with the winding direction rear side). The fitting protrusion 11 has a distal end portion 11a expanding to have a substantially circular cross-sectional shape and having a step surface 11b. A step portion 16a that corresponds to the thickness of the base plate 16 is formed at an end portion of the base plate 16 on the width direction front side (matches with the winding direction front side). The fitting recess 12 is the fitting portion as a counterpart of the fitting protrusion 11, and is formed over the entire length of the profile strip 10 at an end portion of the base plate 16 on the width direction front side that is raised via the step portion 16a. The fitting recess 12 has an opening on the other surface side (inner side at the time of winding) with a narrowed inlet. The fitting recess 12 has a step surface 12a corresponding to the step surface 11b of the fitting protrusion 11.

The reinforcement rib 13 is provided for achieving higher rigidity of the profile strip 10, and protrudes over the entire length of the profile strip 10 on the one surface of the base plate 16, at a portion on the width direction rear side. The reinforcement rib 13 has a distal end portion provided with a flange 13a to have a T shaped cross-sectional shape. The reinforcement rib 15 protrudes over the entire length of the profile strip 10 at a portion corresponding to the fitting recess 12 and expanding on the one surface side. The reinforcement rib 15 has a distal end portion provided with a flange 15a to have a T shaped cross-sectional shape. The engagement rib 14 is formed over the entire length of the profile strip 10, and extends in an inclined manner from the width direction front side end portion to have a portion more on the width direction front side disposed more on the one surface side (outer side at the time of winding).

The profile strip 10 has the reinforcement member 70 made of metal provided between the reinforcement rib 13 and the reinforcement rib 15 and over the entire length of the profile strip 10. The reinforcement member 70 is made by bending a steel plate having a strip shape, and has the expanded portion 71 at a center portion and inclined portions 72 at both end portions. The expanded portion 71 expands toward the one surface side (outer side at the time of winding) to have a C shaped cross-sectional shape. The reinforcement member 70 is fit between the reinforcement rib 13 and the reinforcement rib 15 with distal ends of the left and the right inclined portions 72 respectively engaged with the flanges 13a and 15a. With the reinforcement member 70 thus mounted, the profile strip 10 as a highly rigid self-supporting pipe is formed.

Figure 20A:
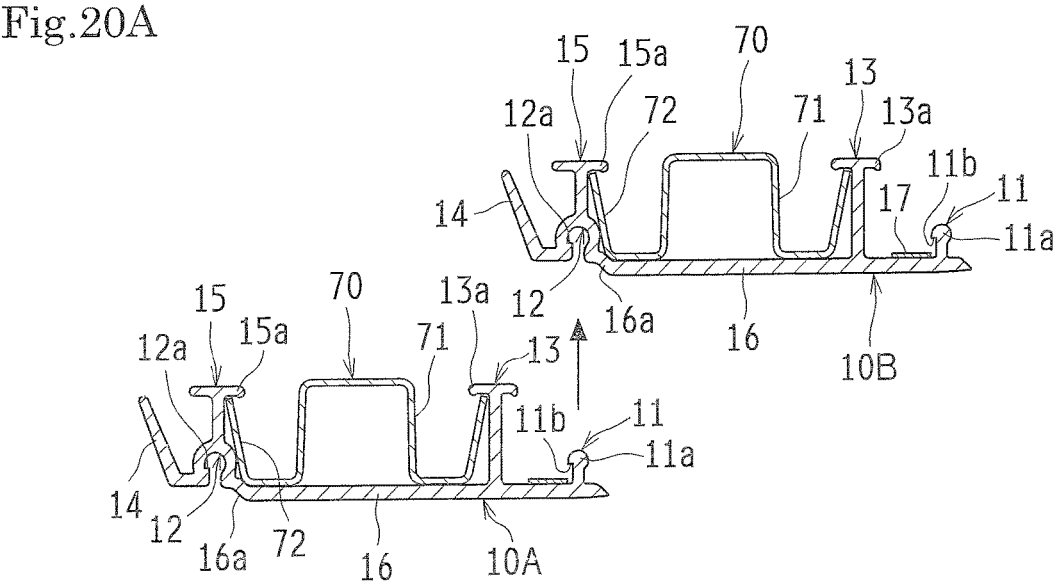
FIG. 20 is a diagram illustrating how fitting portions of the profile strip are fit to each other.
Figure 20B:
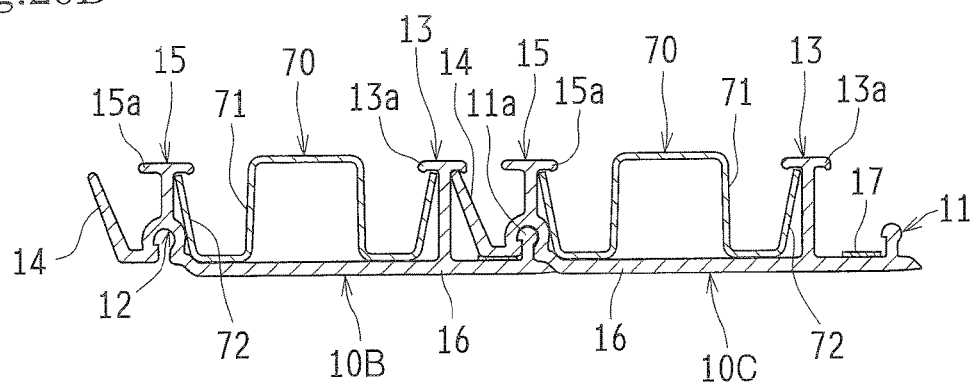
Figure 20C:
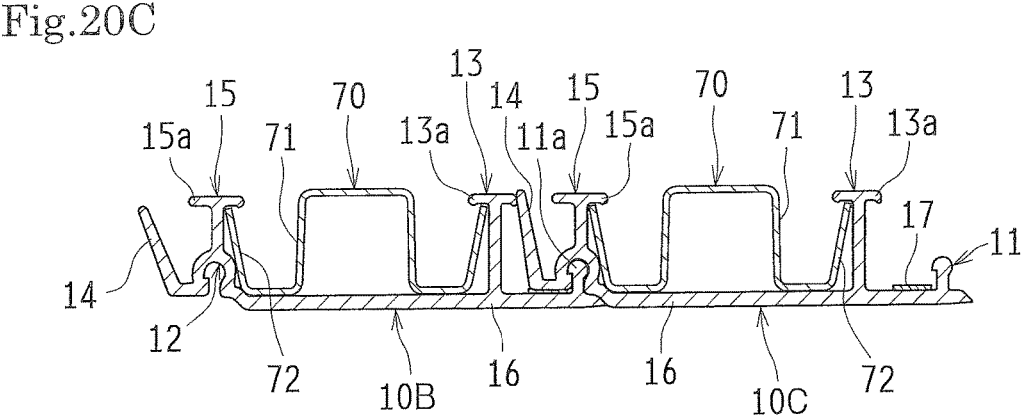

The profile strip 10 thus formed is spirally wound in the winding process, with the first end portion profile strip 10B and the newly supplied profile strip 10A disposed adjacent to each other as illustrated in FIG. 20(a). The fitting protrusion 11 of the newly supplied profile strip 10A is fit to the fitting recess 12 of the first end portion profile strip 10B from the inner surface side (inner circumference side of the formed pipe member 4). The fitting protrusion 11 that has fit in the fitting recess 12 has the step surface 12a engaged with the step surface 11b, and thus is not easily pulled out. The engagement rib 14 of the first end portion profile strip 10B engages with the reinforcement rib 13 of the newly supplied profile strip 10A, while being caught in the flange 13a of the reinforcement rib 13. Thus, the newly supplied profile strip 10A newly becomes the first end portion profile strip 10B as illustrated in FIG. 20(b).

The profile strip 10 in the winding machine 1 according to the present embodiment may be a member other than the profile strip 10 illustrated in FIG. 19(a), as long as the fitting portions 11 and 12, the reinforcement rib 13, and the engagement rib 14 are provided, and the reinforcement member 70 is mounted.

Figure 19B:
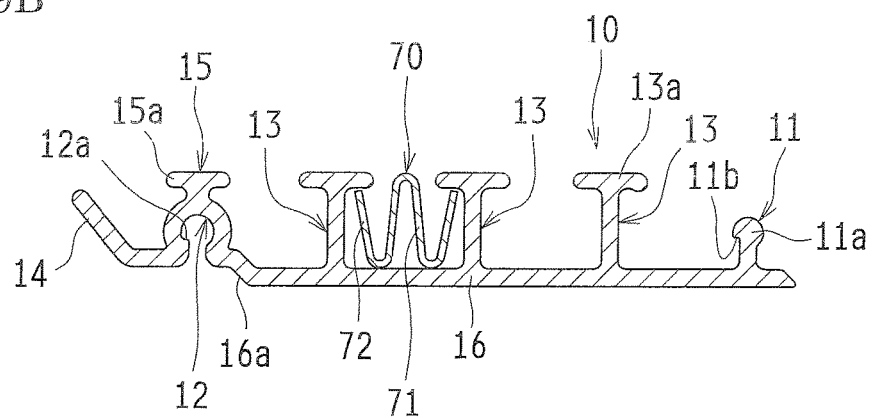

For example, the profile strip 10 illustrated in FIG. 19(b) may be used. This profile strip 10 has three reinforcement ribs 13, and has the reinforcement member 70 mounted thereon. The reinforcement member 70 has a W shaped cross-sectional shape with an inversed V shaped expanded portion 71 formed thereon. For example, the profile strip 10 illustrated in FIG. 19(c) may be used. This profile strip 10 has two reinforcement ribs 13, and has the reinforcement member 70 mounted thereon. The reinforcement member 70 has a W shaped cross-sectional shape with an inversed U shaped expanded portion 71 formed thereon.

Figure 19C:
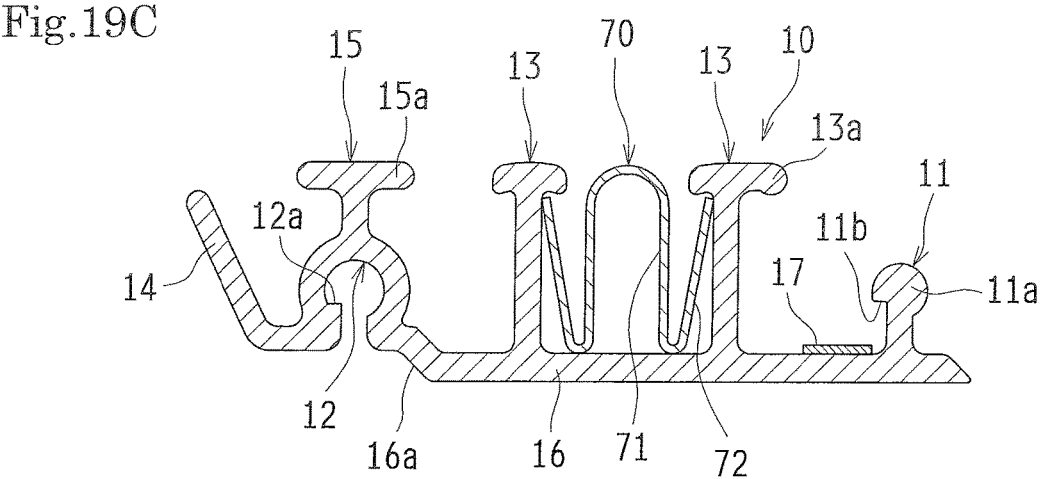

The reinforcement member 70 exemplified in each of FIG. 19(a) to FIG. 19(c) includes the expanded portion 71. Still, the reinforcement member 70 mounted to the profile strip 10 used in the winding machine 1 according to the present embodiment is not limited to the one including the expanded portion 71. Furthermore, the reinforcement member 70 may not be mounted to the profile strip 10 but may be embedded in the profile strip 10.

—Overall Configuration of Winding Machine—

The frame 20 and the first to the third position restricting wheels 80A, 80B, and 80C are the same as those in the previously described embodiment. Thus, the drive unit 60 and the first and the second arms 40 and 50 are described below.

<Drive Unit>

Figure 21:
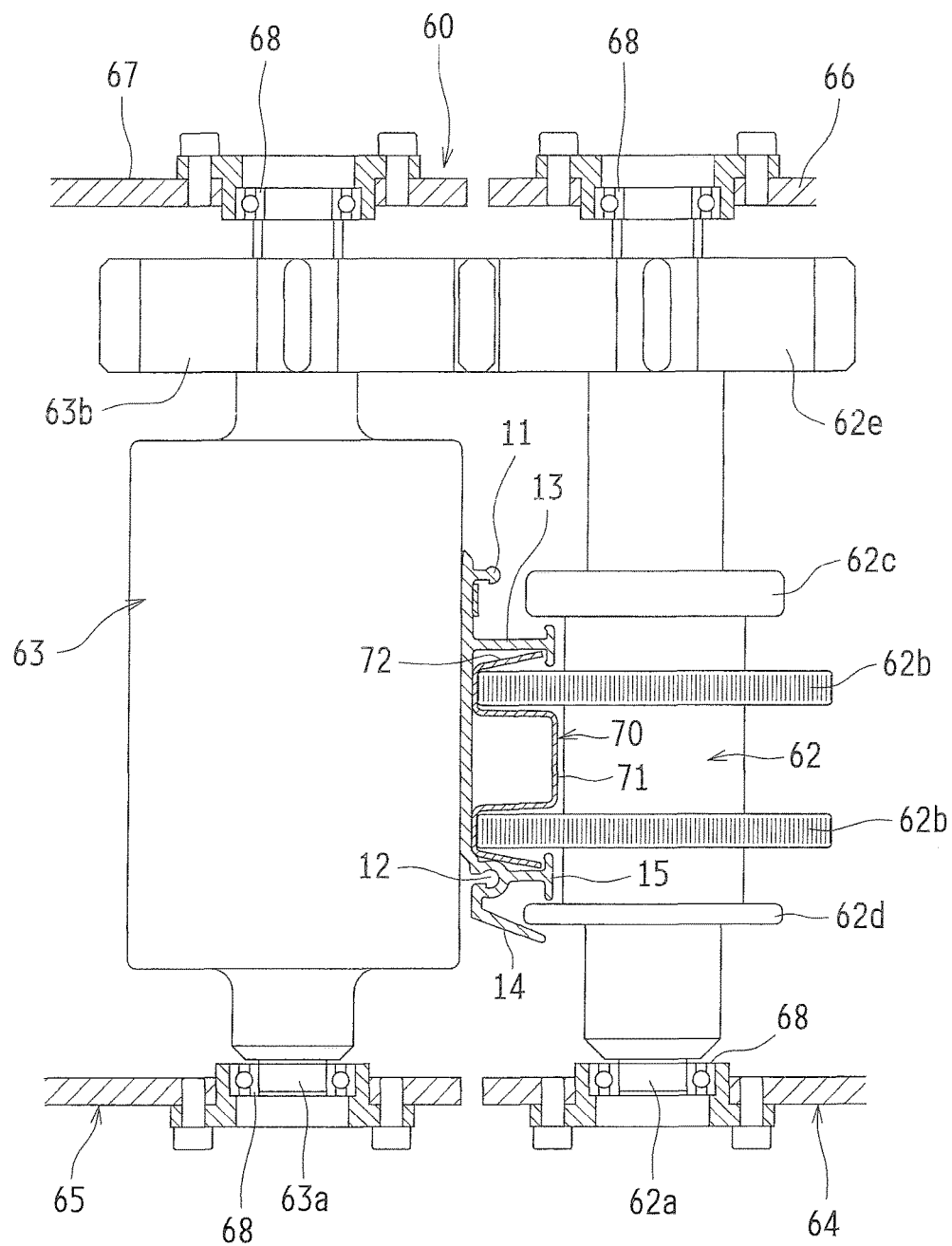
FIG. 21 is a partially cut-out view of a main portion of a drive unit.

The drive unit 60 illustrated in FIG. 21 is substantially the same as the drive unit 60 illustrated in FIG. 11, except for the shape of large diameter portions 62b. The difference is mainly described below.

The outer roller 62 includes: the two large diameter portions 62b; the first small diameter portion 62c; and the second small diameter portion 62d. The two large diameter portions 62b are formed to sandwich the expanded portion 71 of the reinforcement member 70 mounted to the profile strip 10. The first small diameter portion 62c is formed to sandwich the reinforcement rib 13 of the profile strip 10 with the large diameter portion 62b. The second small diameter portion 62d is formed to sandwich the reinforcement rib 15 of the profile strip 10 with the large diameter portion 62b, and is formed to be positioned between the reinforcement rib 15 and the engagement rib 14. Thus, the outer roller 62 rotates without slipping while being in contact with the outer side surface (surface from which the reinforcement rib 13 protrudes) of the profile strip 10. The inner roller 63 is formed of a cylindrical member made of synthetic resin or metal, and is formed to have a length in the axial direction longer than the width of the profile strip 10. The inner roller 63 rotates while being in contact with the inner side surface of the profile strip 10.

<First and Second Arms>

Figure 24:
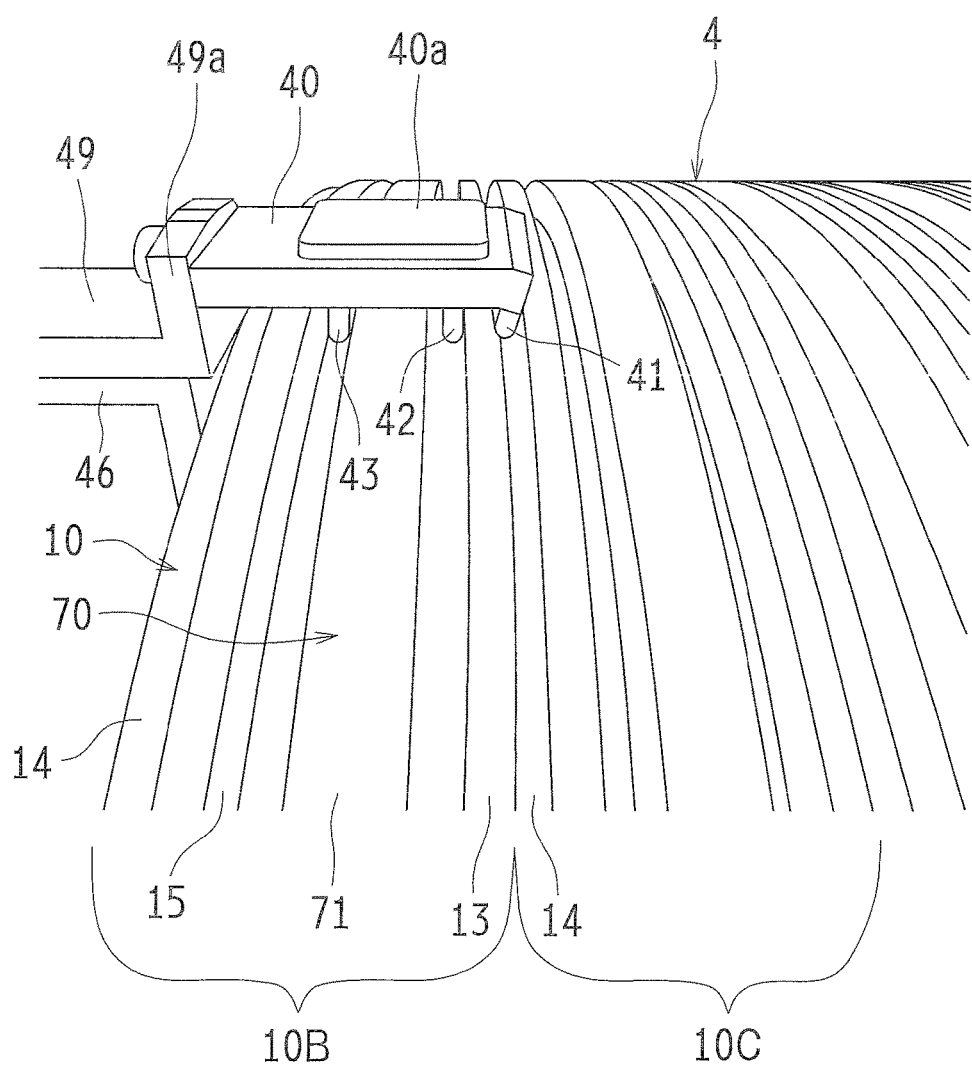
FIG. 24 is a schematic perspective view of the first arm.
Figure 25:
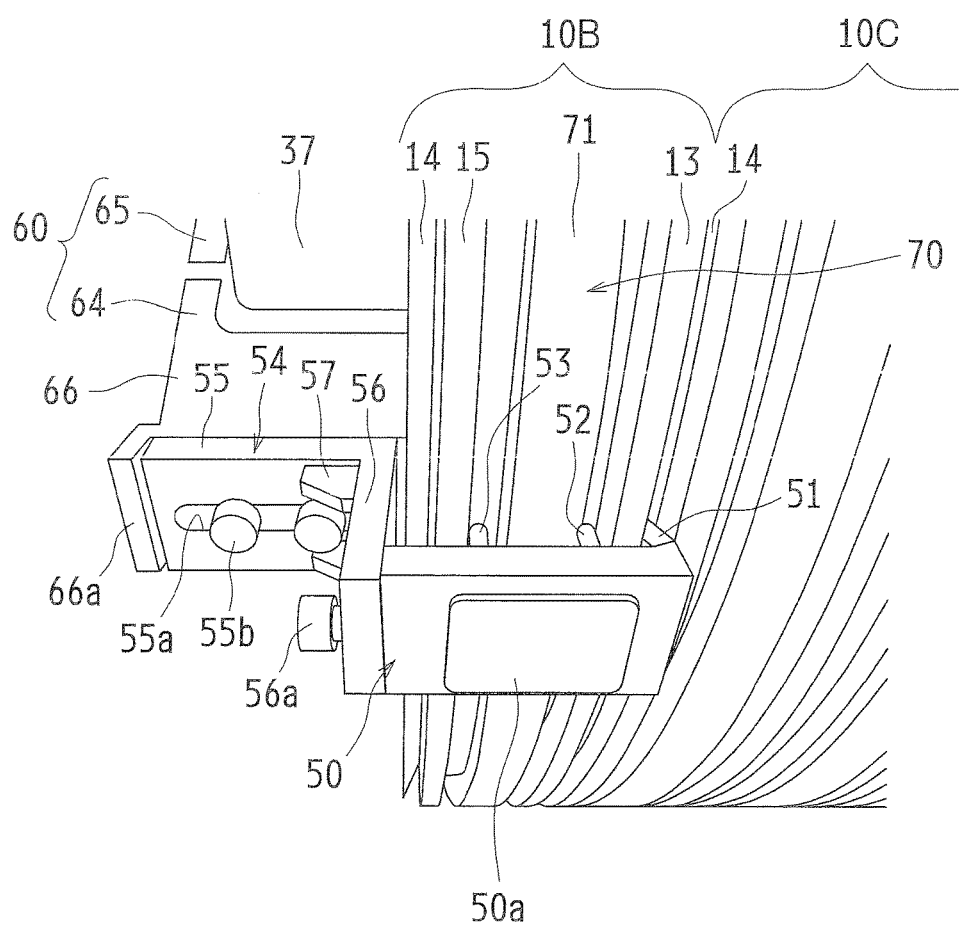
FIG. 25 is a schematic perspective view of the second arm.

The first arm 40 and the second arm 50 are made of metal, have a flat plate shape, are disposed close to the outer circumference surface of the first end portion profile strip 10B, and are arranged in parallel with a tangential direction of the outer circumference surface (to face the outer circumference surface), as illustrated in FIGS. 24 and 25.

As illustrated in FIG. 16, the fitting position 5, the first arm 40, and the second arm 50 are arranged in this order in the supplying direction of the profile strip 10 with the first arm 40 disposed close to the fitting position 5. The first arm 40 and the second arm 50 are supported by the frame 20 to be at positions away from each other in the circumference direction.

As illustrated in FIG. 22, the first arm 40 is supported by the link member 22 coupled to the link frame 31 of the second coupling link member 30, via the fixing member 47, the first attachment bracket 44, and the slide member 49. The fixing member 47, the first attachment bracket 44, and the slide member 49 have the configurations that are the same as those in the first embodiment, and thus the description thereof is omitted.

The first arm 40 is formed to be thinner than the gap between the existing pipe 2 and the formed pipe member 4. Thus, the first arm 40 can make a circular movement outside of the first end portion profile strip 10B as illustrated in FIG. 13, even when the gap between the outer circumference surface of the first end portion profile strip 10B and the inner circumference surface of the existing pipe 2 is small, with the distance between the existing pipe 2 and the formed pipe member 4 adjusted with the first and the second position restricting wheels 80A and 80B.

The reinforcement plate 40a is attached to the outer side surface of the first arm 40. The first guide portion 41, a third restricting portion 42, and the first restricting portion 43 are arranged in this order from the rear side to the front side in the axial direction, on the inner side surface of the first arm 40.

As described above, the first guide portion 41 is used for fitting the engagement rib 14 of the second end portion profile strip 10C to the reinforcement rib 13 of the first end portion profile strip 10B. The first guide portion 41 has an arch shape as viewed in the axial direction. The first guide portion 41 extends in an inclined manner from the distal end portion of the first arm 40 to have a portion more on the radial direction inner side disposed more on the axial direction front side, so that the arch shaped distal end portion comes into contact with the winding direction rear side of the engagement rib 14 of the second end portion profile strip 10C. The engagement rib 14 is inclined to have a portion more on the winding direction front side disposed more on the radial direction outer side, whereas the first guide portion 41 is inclined to have a portion more on the winding direction front side disposed more on the radial direction inner side. Thus, the first guide portion 41 and the engagement rib 14 extend in crossing directions, and thus can certainly be in contact with each other. The first guide portion 41 extends in an inclined manner to have a portion more on the winding direction front side disposed more on the radial direction inner side. Thus, the engagement rib 14 of the second end portion profile strip 10C can be inclined toward the reinforcement rib 13 of the first end portion profile strip 10B, whereby the engagement of the sub locks can be facilitated.

The first arm 40 is disposed close to the fitting position 5. Immediately after the fitting protrusion 11 of the newly supplied profile strip 10A is fit to the fitting recess 12 of the first end portion profile strip 10B at the fitting position 5, the first guide portion 41 comes into contact with the engagement rib 14 so that the engagement rib 14 is fit to the reinforcement rib 13. Thus, the engagement of the sub locks can be ensured immediately after the fitting of the main locks is achieved.

The third restricting portion 42 prevents the reinforcement rib 13 from inclining toward the winding direction front side when the engagement rib 14 is fit to the reinforcement rib 13 with the first guide portion 41. The third restricting portion 42 extends from the inner side surface of the first arm 40 toward the radial direction inner side, and comes into contact with the winding direction front side of the reinforcement rib 13. With the third restricting portion 42 thus provided, the engagement of the sub locks can be ensured with the reinforcement rib 13 being prevented from inclining (bending) toward the winding direction front side even when the reinforcement rib 13 is pressed via the engagement rib 14 as a result of contact between the distal end portion of the first guide portion 41 and the engagement rib 14.

The first restricting portion 43 of the present embodiment has the function described in the first embodiment, and further has a function of preventing the movement of the second end portion profile strip 10C when the engagement rib 14 is fit to the reinforcement rib 13 with the first guide portion 41. The first restricting portion 43 extends from the inner side surface of the first arm 40 toward the radial direction inner side, and comes into contact with the winding direction front side of the expanded portion 71 of the reinforcement member 70 mounted to the first end portion profile strip 10B. With the first restricting portion 43 thus provided, the movement of the second end portion profile strip 10C toward the winding direction front side is prevented by the reinforcement member 70 and the first end portion profile strip 10B. Thus, the movement of the first end portion profile strip 10B toward the winding direction front side is prevented at a portion in front of the fitting position 5. Thus, the constant distance in the winding direction can be maintained between the winding direction front side end portion of the first end portion profile strip 10B and the winding direction rear side end portion of the newly supplied profile strip 10A, whereby the smooth fitting of the main locks can be achieved.

As illustrated in FIG. 23, the second arm 50 is supported by the drive unit 60 via the second attachment bracket 54. The second attachment bracket 54 has the configuration that is the same as that in the first embodiment, and thus the description thereof is omitted.

The second arm 50 is formed to be thinner than the gap between the existing pipe 2 and the formed pipe member 4. Thus, the second arm 50 can make a circular movement outside of the first end portion profile strip 10B as illustrated in FIG. 14, even when the gap between the outer circumference surface of the formed pipe member 4 and the inner circumference surface of the existing pipe 2 is small, with the distance between the existing pipe 2 and the formed pipe member 4 adjusted with the second and the third position restricting wheels 80B and 80C.

The reinforcement plate 50a is attached to the outer side surface of the second arm 50. The second guide portion 51, the second restricting portion 52, and a fourth restricting portion 53 are arranged in this order from the rear side to the front side in the axial direction, on the inner side surface of the second arm 50.

The second guide portion 51 is used for fitting the engagement rib 14 of the second end portion profile strip 10C to the reinforcement rib 13 of the first end portion profile strip 10B, as in the case of the first guide portion 41. The second guide portion 51 extends in an inclined manner from the distal end portion of the second arm 50 to have a portion more on the radial direction inner side disposed more on the axial direction front side, so that the distal end portion comes into contact with the winding direction rear side of the engagement rib 14 of the second end portion profile strip 10C, as in the case of the first guide portion 41. The second guide portion 51 is used for fitting the engagement rib 14 to the reinforcement rib 13 when the engagement of the sub locks cannot be sufficiently achieved with the first guide portion 41, and has the shape different from that of the first guide portion 41. More specifically, the second guide portion 51 has such a shape that a portion to be in contact with the engagement rib 14 of the second end portion profile strip 10C and with the reinforcement rib 13 of the first end portion profile strip 10B conforms to the outer shapes of the engagement rib 14 and the reinforcement rib 13 in a state where the sub locks are engaged. More specifically, a contact surface 51a and a recess 51b are formed in the distal end portion of the second guide portion 51. The contact surface 51a is in parallel with the inclined surface of the engagement rib 14. The flange 13a of the reinforcement rib 13 fits to the recess 51b. Thus, even when the engagement of the sub locks cannot be sufficiently achieved by the first guide portion 41, the engagement of the sub locks can be ensured with the second guide portion 51.

As described above, the second restricting portion 52 restricts the position of the winding machine 1 relative to the formed pipe member 4 in the winding direction. The second restricting portion 52 extends from the inner side surface of the second arm 50 toward the radial direction inner side, and comes into contact with the winding direction rear side of the expanded portion 71 of the reinforcement member 70 mounted to the first end portion profile strip 10B. With the second restricting portion 52 thus provided, when the water pressure acts on the winding machine 1 from the winding direction rear side, the reinforcement member 70 is caught by the second restricting portion 52, whereby the winding machine 1 is prevented from being pushed out from the formed pipe member 4 toward the front side. The second restricting portion 52 comes into contact with the reinforcement member 70 of the first end portion profile strip 10B so that the position of the winding machine 1 relative to the formed pipe member 4 is restricted. Thus, the constant distance can be maintained between the winding direction rear side end portion of the newly supplied profile strip 10A and the winding direction front side end portion of the first end portion profile strip 10B, whereby the fitting of the main locks can be ensured.

The fourth restricting portion 53 extends from the inner side surface of the second arm 50 toward the radial direction inner side, and is positioned between the reinforcement rib 15 of the first end portion profile strip 10B and the expanded portion 71 of the reinforcement member 70 mounted to the first end portion profile strip 10B. In the present embodiment, the winding machine 1 is prevented from being jammed in the formed pipe member 4 (moving toward the winding direction rear side) with the first restricting portion 43 being in contact with the winding direction front side of the expanded portion 71 of the reinforcement member 70 mounted to the first end portion profile strip 10B and with the flanges 29a and 33a of the first and the second flanged rollers 29 and 33 rotating while being in contact with the winding direction front end of the formed pipe member 4. Thus, the fourth restricting portion 53 has a function of preventing the winding machine 1 from being jammed in the formed pipe member 4, by coming into contact with the winding direction front side of the expanded portion 71 of the reinforcement member 70 mounted to the first end portion profile strip 10B, when the first restricting portion 43 and the first and the second flanged rollers 29 and 33 fail to function.

FIG. 26(a) to FIG. 26(d) respectively correspond to FIG. 17(a) to FIG. 17(d) described above. The profile strip 10 that has passed through the pinch rollers 61 before the state illustrated in FIG. 26(a) is achieved is illustrated with a broken line, and the profile strip 10 that has passed through the pinch rollers 61 after the state illustrated in FIG. 26(a) is achieved is illustrated with a solid line. The relationship between the profile strip 10, illustrated in the solid line, and the first and the second arms 40 and 50 is described below with reference to FIG. 26 while focusing on the difference from FIG. 17.

As illustrated in FIG. 26(a), the newly supplied profile strip 10A supplied from the pinch rollers 61 has the fitting protrusion 11 fit to the fitting recess 12 at the fitting position 5 to newly become the first end portion profile strip 10B. Immediately after this, the first arm 40 disposed close to the fitting position 5 passes through the radial direction outer side of the first end portion profile strip 10B as illustrated in FIG. 26(b).

Then, as illustrated in FIG. 26(c), the second arm 50 starts to pass through the radial direction outer side of the first end portion profile strip 10B as illustrated in FIG. 26(c). In this process, the second restricting portion 52 comes into contact with the winding direction rear side of the expanded portion 71 of the reinforcement member 70 mounted to the first end portion profile strip 10B. The second restricting portion 52 is constantly in contact with the reinforcement member 70 while the second arm 50 is making a circular movement on the radial direction outer side of the first end portion profile strip 10B. Thus, the position of the winding machine 1 relative to the formed pipe member 4 in the winding direction is restricted. As a result, the constant distance in the winding direction is maintained between the winding direction rear side end portion of the newly supplied profile strip 10A and the winding direction front side end portion of the first end portion profile strip 10B. All things considered, the engaging of the main locks can be ensured.

The flanges 29a and 33a of the first and the second flanged rollers 29 and 33 are in contact with the winding direction front end of the first end portion profile strip 10B. Thus, the first end portion profile strip 10B is sandwiched by the flanges 29a and 33a and the second restricting portion 52 in the axial direction. Thus, the winding machine 1 can be prevented from being pushed out from the formed pipe member 4 toward the winding direction front side due to the water pressure and the like or being jammed in the formed pipe member 4. The first and the second flanged rollers 29 and 33 and the second arm 50 are disposed at positions away from each other in the circumference direction of the frame 20. Thus, the winding machine 1 is prevented from rotating around the radial direction.

Then, as illustrated in FIG. 26(d), the first arm 40 passes through the radial direction outer side of the new first end portion profile strip 10B. In this process, the first guide portion 41 comes into contact with the engagement rib 14 of the second end portion profile strip 10C, and the third restricting portion 42 comes into contact with the winding direction front side of the reinforcement rib 13. Thus, the engagement rib 14 is fit to the reinforcement rib 13 that is in state of being prevented from inclining toward the winding direction front side. Thus, the sub locks can be engaged.

The first restricting portion 43 is in contact with the winding direction front side of the expanded portion 71 of the reinforcement member 70 mounted to the first end portion profile strip 10B. Thus, the first end portion profile strip 10B to subsequently become the second end portion profile strip 10C is prevented from moving. Thus, the constant distance in the winding direction can be maintained between the winding direction front side end portion of the first end portion profile strip 10B and the winding direction rear side end portion of the newly supplied profile strip 10A, whereby the smooth fitting of the main locks can be achieved.

When the second arm 50 passes through the radial direction outer side of the first end portion profile strip 10B after the state illustrated in FIG. 26(d), the engagement rib 14 is fit to the reinforcement rib 13 with the second guide portion 51, if the engagement of the sub locks achieved by the first guide portion 41 is insufficient.

By repeating the operations described above, the rehabilitating pipe 3 can be formed in the existing pipe 2 by sequentially adding the newly supplied profile strip 10A to the winding direction front end of the formed pipe member 4, with the main locks fit and the sub locks engaged.

Other Embodiments

The present invention is not limited to the embodiments, and can be implemented in various ways without departing from the gist and the main feature of the present invention.

In the embodiments described above, the first arm 40 and the second arm 50 are formed of a flat plate. However, this should not be construed in a limiting sense. For example, a plate curved to conform with the outer circumference surface of the formed pipe member 4 may be used. The choice is not limited to the plate as long as the first restricting portion 43 and the like can be supported. For example, an arm with a circular or a polygonal column shape may be used. When the rigidity of the reinforcement member 120 and the like is low, the thickness of the first arm 40 and the second arm 50 may be larger than the gap between the existing pipe 2 and the formed pipe member 4 or there may be substantially no gap between the existing pipe 2 and the formed pipe member 4.

In the embodiments described above, the pinch rollers 61, the first arm 40, and the second arm 50 are arranged in this order in the supplying direction of the profile strip 10, 100. However, this should not be construed in a limiting sense, and the first arm 40 and the second arm 50 may be arranged in the opposite order.

In the embodiments described above, the substantially annular frame 20 is used as the main body. However, this should not be construed in a limiting sense. For example, a structure of rotatably supporting the link roller 21 with a cross-shaped board may be employed and a main body including no link roller 21 may be employed.

In the embodiments described above, the curl-forming device 94 is used in combination. However, the curl-forming device 94 is not necessarily used in combination.

In the first embodiment, the first restricting portion 43 comes into contact with the winding direction front side of the reinforcement member 120 and the second restricting portion 52 comes into contact with the winding direction rear side of the reinforcement member 120. Alternatively, the first restricting portion 43 may come into contact with the winding direction rear side of the reinforcement member 120, and the second restricting portion 52 may come into contact with the winding direction front side of the reinforcement member 120.

In the first embodiment, the first restricting portion 43 and the second restricting portion 52 come into contact with the reinforcement member 120 of the end portion profile strip 100B. However, this should not be construed in a limiting sense. The first restricting portion 43 and the second restricting portion 52 may come into contact with the reinforcement member 120 of any one of the profile strips 100 forming the formed pipe member 4.

In the second embodiment, the first arm 40 is disposed close to the fitting position 5, and the engagement rib 14 is fit to the reinforcement rib 13 with the first guide portion 41 at the timing when (or immediately after) the fitting of the main locks is achieved. However, this should not be construed in a limiting sense. The first arm 40 may be disposed at any position on the substantially annular frame 20 as long as the engagement rib 14 of the second end portion profile strip 10C can be fit to the reinforcement rib 13 of the first end portion profile strip 10B.

In the second embodiment, the fourth restricting portion 53 is provided as an auxiliary part. However, this should not be construed in a limiting sense. For example, the position of the winding machine 1 relative to the formed pipe member 4 may be restricted, with the fourth restricting portion 53 being in contact with the winding direction front side of the expanded portion 71 of the reinforcement member 70 mounted to the first end portion profile strip 10B to sandwich the expanded portion 71 with the second restricting portion 52 in the winding direction.

In the second embodiment, the first restricting portion 43 and the second restricting portion 52 come into contact with the expanded portion 71. However, this should not be construed in a limiting sense. For example, the first restricting portion 43, the second restricting portion 52, and the like may come into contact with the reinforcement ribs 13 and 15 of the first end portion profile strip 10B or the inclined portion 72 of the reinforcement member 70.

In the second embodiment, the second guide portion 51 has a shape conforming to the outer shapes of the engagement rib 14 of the second end portion profile strip 10C and the reinforcement rib 13 of the first end portion profile strip 10B in the state where the sub locks are engaged. However, this should not be construed in a limiting sense. The second guide portion 51 may have the same shape as the first guide portion 41 or any other shapes. For example, the distal end portion of the first guide portion 41 illustrated in FIG. 22(*b*) is rounded. Alternatively, a second guide portion 58 illustrated in FIG. 27(*a*) may be employed. This second guide portion 58 has a corner (at a right angle in a lateral cross-sectional view) formed at a portion to be in contact with the engagement rib 14, so that more rigid contact with the engagement rib 14 can be achieved.

Figure 27A:
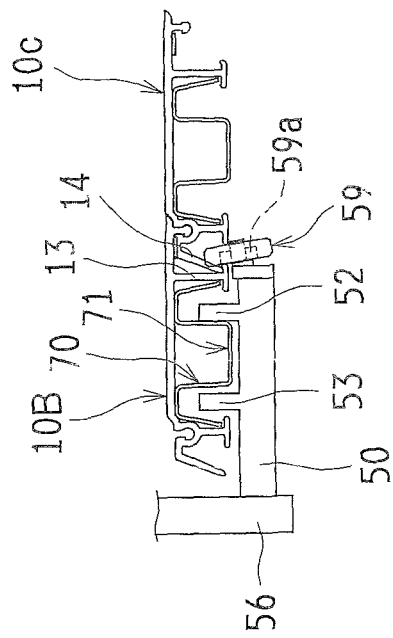
FIG. 27 is a schematic view of second guide portions as examples according to other embodiments.
Figure 27B:
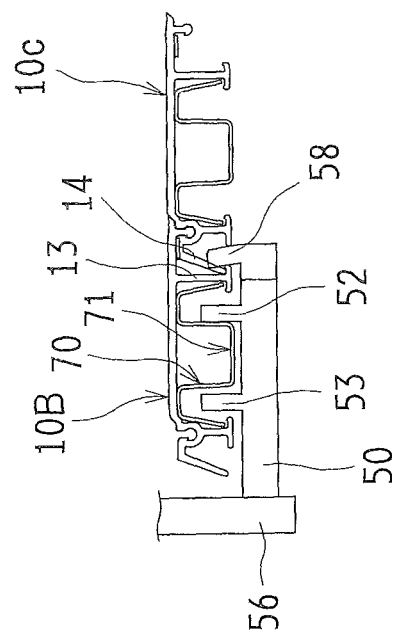

For example, as illustrated in FIG. 27(*b*), a second guide portion 59 having a disk shape may be rotatably attached to the axial direction rear side end portion of the second arm 50 via a bearing 59*a*. In this configuration, the engagement rib 14 is fit to the reinforcement rib 13 with the second guide portion 59 that rotates with respect to the second arm 50 being in contact with the engagement rib 14 while being rotated. Thus, the engagement of the sub lock can be ensured as in the case where the outer roller is used. As illustrated in FIG. 27(*b*), the second guide portion 59 is inclined and has a center portion attached to a portion of the second arm 50 more on the radial direction inner side, and thus does not protrude beyond the second arm 50 toward the radial direction outer side. All things considered, the second arm 50 can make a circular movement between the formed pipe member 4 and the existing pipe 2 even when the gap between the outer circumference surface of the formed pipe member 4 and the inner circumference surface of the existing pipe 2 is small.

As described above, the embodiments described above are intended to be illustrative in all respects and should not be construed in a limiting sense. Any modifications and changes falling within the scope of equivalents of the appended claims are within the scope of the present invention. The present application claims priority to Japanese Patent Application No. 2014-116214, the entire content of which is incorporated herein by reference.

INDUSTRIAL APPLICABILITY

In the present invention, a rehabilitating pipe can certainly be formed with an arm provided with a member using an outer circumference portion of the rehabilitating pipe being formed or a member acting on the outer circumference portion of the rehabilitating pipe being formed, in accordance with a work condition, a shape of a profile strip, and the like. Thus, the present invention is extremely suitably applied to a winding machine that forms a rehabilitating pipe by using a profile strip.

REFERENCE SIGNS LIST

1 Winding machine
2 Existing pipe
3 Rehabilitating pipe
4 Formed pipe member
5 Fitting position
10 Profile strip
10A Newly supplied profile strip
10B First end portion profile strip
10C Second end portion profile strip
11 Fitting protrusion (fitting portion)
12 Fitting recess (fitting portion)
13 Reinforcement rib
14 Engagement rib
20 Frame (main body)
29 First flanged roller
29*a* Flange
33 Second flanged roller
33*a* Flange
40 First arm
41 First guide portion
42 Third restricting portion
43 First restricting portion
50 Second arm
51 Second guide portion
52 Second restricting portion
53 Fourth restricting portion
58 Second guide portion
59 Second guide portion
70 Reinforcement member
100 Profile strip
100A Newly supplied profile strip
100B End portion profile strip
111 Fitting protrusion (fitting portion)
112 Fitting recess (fitting portion)
120 Reinforcement member

The invention claimed is:
1. A winding machine configured to form a pipe member in an existing pipe by winding a profile strip having an elongated shape, the winding machine comprising:
a main body that moves toward a winding direction front side as the profile strip is added, while rotating at a winding direction front end portion of the pipe member; and
an arm that is supported by the main body and extends toward a winding direction rear side between the existing pipe and the pipe member, wherein the arm includes a restricting portion that comes into contact with a reinforcement member provided to the profile strip forming the pipe member, directly or via the profile strip, and
wherein the restricting portion extends toward a radial direction inner side from the arm.

2. A winding machine configured to form a pipe member in an existing pipe by winding a profile strip having an elongated shape, the winding machine comprising:
a main body that moves toward a winding direction front side as the profile strip is added, while rotating at a winding direction front end portion of the pine member; and
an arm that is supported by the main body and extends toward a winding direction rear side between the existing pipe and the pipe member,
wherein the arm includes a restricting portion that comes into contact with a reinforcement member provided to the profile strip forming the nine member, directly or via the profile strip,
wherein the profile strip includes a reinforcement rib protruding on an outer side surface and an engagement rib extending toward a front side from a width direction front side end portion,
wherein the arm includes a first arm, and
wherein the first arm includes:
a first guide portion that comes into contact with the engagement rib of a second end portion of the profile strip that is adjacent to and disposed on a winding direction rear side of a first end portion of the profile strip that is positioned at the winding direction front end of the pipe member including the profile strip previously formed in a pipe form, and causes the engagement rib to be engaged with the reinforcement rib of the first end portion of the profile strip; and
a first restricting portion as the restricting portion that comes into contact with a winding direction front side of the reinforcement member provided to the first end portion of the profile strip, directly or via the first end portion of the profile strip.

3. The winding machine according to claim 2, wherein the engagement rib extends in an inclined manner from the width direction front side end portion of the profile strip to have a portion more on the front side disposed more on an outer side, and
wherein the first guide portion extends in an inclined manner from a winding direction rear side end portion of the first arm to have a portion more on the winding direction front side disposed more on an inner side, so that a distal end portion of the first guide portion comes into contact with a winding direction rear side of the engagement rib of the second end portion of the profile strip.

4. The winding machine according to claim 3, wherein the first arm further includes a third restricting portion that comes into contact with a winding direction front side of the reinforcement rib of the first end portion of the profile strip.

5. The winding machine according to claim 3, further comprising a second arm that is supported by the main body at a position away from the first arm in a circumference direction of the pipe member and extends toward the winding direction rear side between the existing pipe and the pipe member,
wherein the second arm includes a second restricting portion that comes into contact with a winding direction rear side of the reinforcement member provided to the first end portion of the profile strip, directly or via the first end portion of the profile strip.

6. The winding machine according to claim 2, wherein the first arm further includes a third restricting portion that comes into contact with a winding direction front side of the reinforcement rib of the first end portion of the profile strip.

7. The winding machine according to claim 6, further comprising a second arm that is supported by the main body at a position away from the first arm in a circumference direction of the pipe member and extends toward the winding direction rear side between the existing pipe and the pipe member,
wherein the second arm includes a second restricting portion that comes into contact with a winding direction rear side of the reinforcement member provided to the first end portion of the profile strip, directly or via the first end portion of the profile strip.

8. The winding machine according to claim 2, further comprising a second arm that is supported by the main body at a position away from the first arm in a circumference direction of the pipe member and extends toward the winding direction rear side between the existing pipe and the pipe member,
wherein the second arm includes a second restricting portion that comes into contact with a winding direction rear side of the reinforcement member provided to the first end portion of the profile strip, directly or via the first end portion of the profile strip.

9. The winding machine according to claim 8, wherein the second arm further includes a fourth restricting portion that sandwiches the reinforcement member of the first end portion of the profile strip with the second restricting portion in the winding direction, by coming into contact with the winding direction front side of the reinforcement member directly or via the first end portion of the profile strip.

10. The winding machine according to claim 9, wherein the second arm further includes a second guide portion that comes into contact with the engagement rib of the second end portion of the profile strip and causes the engagement rib to engage with the reinforcement rib of the first end portion of the profile strip.

11. The winding machine according to claim 8 further comprising a roller that is rotatably supported by the main body and has a flange that comes into contact with the winding direction front end of the pipe member.

12. The winding machine according to claim 11, wherein the second arm further includes a second guide portion that comes into contact with the engagement rib of the second end portion of the profile strip and causes the engagement rib to engage with the reinforcement rib of the first end portion of the profile strip.

13. The winding machine according to claim 8, wherein the second arm further includes a second guide portion that comes into contact with the engagement rib of the second end portion of the profile strip and causes the engagement rib to engage with the reinforcement rib of the first end portion of the profile strip.

14. The winding machine according to claim 13, wherein the second guide portion extends in an inclined manner from a winding direction rear side end portion of the second arm to have a portion more on the winding direction front side disposed more on an inner side, so that a distal end portion of the second guide portion comes into contact with a winding direction rear side of the engagement rib of the second end portion of the profile strip, and has a shape different from a shape of the first guide portion.

15. A winding machine configured to form a pipe member in an existing pipe by winding a profile strip having an elongated shape, the winding machine comprising:

a main body that moves toward a winding direction front side as the profile strip is added, while rotating at a winding direction front end portion of the pipe member; and an arm that is supported by the main body and extends toward a winding direction rear side between the existing pipe and the pine member, wherein the arm includes a restricting portion that comes into contact with a reinforcement member provided to the profile strip forming the nine member, directly or via the profile strip, wherein the arm further includes: first and second arms that are supported by the main body respectively at positions away from each other in a circumference direction of the pipe member, and extend toward the winding direction rear side between the existing pipe and the pipe member, wherein the first arm as the restricting portion includes a first restricting portion that comes into contact with a winding direction front or rear side of the reinforcement member provided to the profile strip forming the pipe member, directly or via the profile strip, and wherein the second arm as the restricting portion includes a second restricting portion that comes into contact with a side of the reinforcement member provided to the profile strip forming the pipe member, the side of the reinforcement member being opposite to the side to be in contact with the first restricting portion, directly or via the profile strip.

\* \* \* \* \*